(12) United States Patent
Ishizaka

(10) Patent No.: US 8,976,930 B2
(45) Date of Patent: Mar. 10, 2015

(54) RADIATION IMAGE CAPTURING SYSTEM AND CONSOLE

(71) Applicant: Syuugo Ishizaka, Hachioji (JP)

(72) Inventor: Syuugo Ishizaka, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 160 days.

(21) Appl. No.: 13/853,251

(22) Filed: Mar. 29, 2013

(65) Prior Publication Data

US 2013/0259203 A1 Oct. 3, 2013

(30) Foreign Application Priority Data

Mar. 29, 2012 (JP) .................................. 2012-075831

(51) Int. Cl.
- *H05G 1/64* (2006.01)
- *H04N 5/32* (2006.01)
- *H04N 5/232* (2006.01)
- *H04N 5/361* (2011.01)

(52) U.S. Cl.
CPC . *H05G 1/64* (2013.01); *H04N 5/32* (2013.01); *H04N 5/23293* (2013.01); *H04N 5/361* (2013.01)
USPC .......................................................... 378/98.2

(58) Field of Classification Search
USPC .................... 378/19, 98.8, 62, 146
See application file for complete search history.

(56) References Cited

U.S. PATENT DOCUMENTS

| | | | |
|---|---|---|---|
| 6,330,303 B1 * | 12/2001 | Yamane et al. | 378/98.8 |
| 6,991,996 B2 * | 1/2006 | Sugatani et al. | 438/462 |
| 7,211,803 B1 | 5/2007 | Dhurjaty et al. | |
| 8,841,623 B2 * | 9/2014 | Jung | 250/370.09 |

FOREIGN PATENT DOCUMENTS

| | | |
|---|---|---|
| JP | 6-342099 A | 12/1994 |
| JP | 9-73144 A | 3/1997 |
| JP | 2006-58124 A | 3/2006 |
| JP | 2009-219538 A | 10/2009 |
| WO | 2011/135917 A1 | 11/2011 |
| WO | 2011/152093 A1 | 12/2011 |

* cited by examiner

Primary Examiner — Irakli Kiknadze
(74) Attorney, Agent, or Firm — Cantor Colburn LLP

(57) ABSTRACT

A radiation image capturing system and a console are described. The radiation image capturing system includes a radiation image capturing apparatus and a console. The console holds in advance a relationship between a number of the scanning line from which readout of the image data is started and an offset amount superimposed on the image data to be read out. When the preview image is displayed, the console modifies the relationship so that the starting point is moved to a position of the scanning line from which the radiation image capturing apparatus actually starts the readout, calculates the offset amount for each of the scanning lines, and displays the preview image based on a value obtained by subtracting the offset amount from the corresponding preview image data.

6 Claims, 22 Drawing Sheets

FIG.9
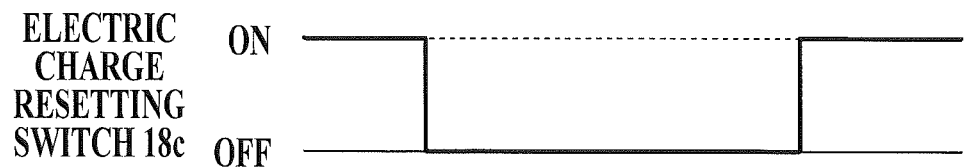
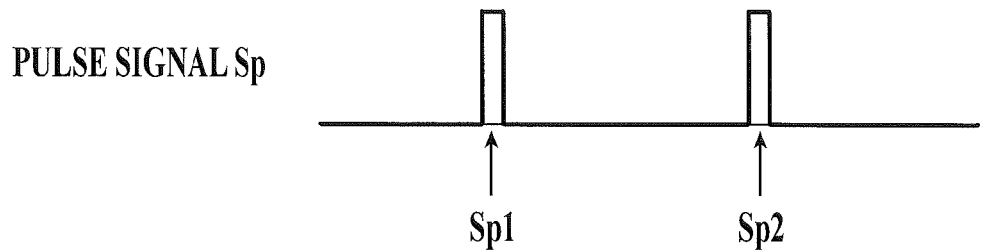
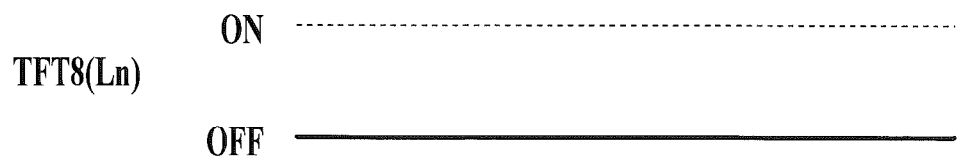
FIG.10
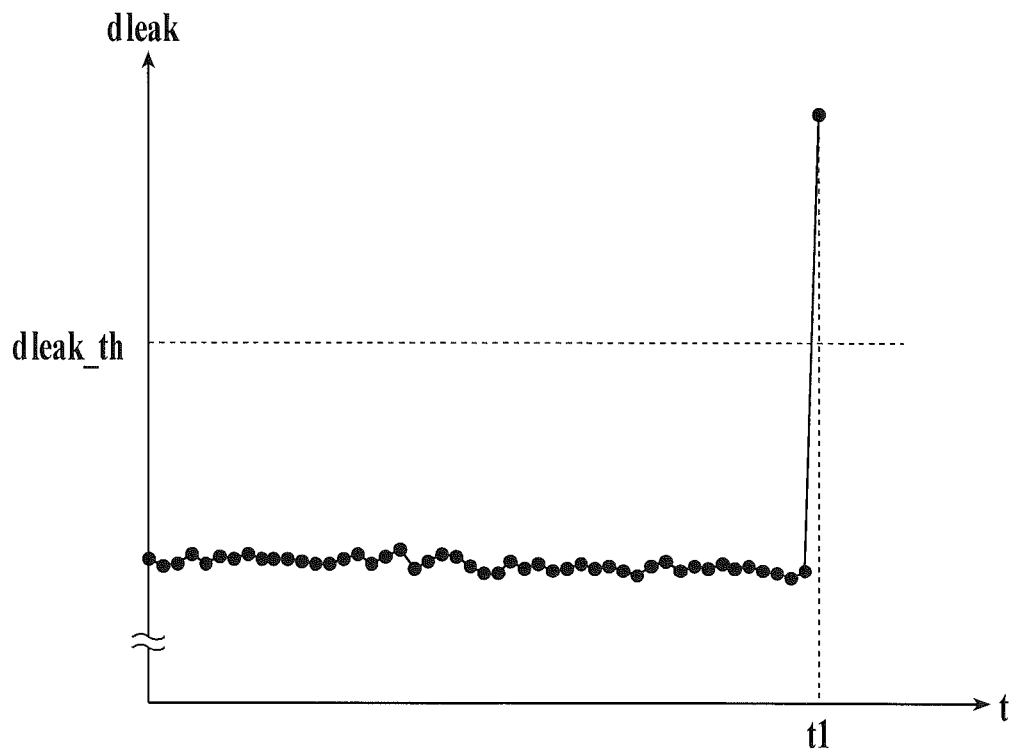

FIG.17

| | | | | | | |
|---|---|---|---|---|---|---|
| L1 | D(1,1) | D(1,2) | D(1,3) | D(1,4) | D(1,5) | |
| L2 | D(2,1) | D(2,2) | D(2,3) | D(2,4) | D(2,5) | |
| L3 | D(3,1) | D(3,2) | D(3,3) | D(3,4) | D(3,5) | |
| L4 | D(4,1) | D(4,2) | D(4,3) | D(4,4) | D(4,5) | |
| L5 | D(5,1) | D(5,2) | D(5,3) | D(5,4) | D(5,5) | |
| L6 | D(6,1) | D(6,2) | D(6,3) | D(6,4) | D(6,5) | |
| L7 | D(7,1) | D(7,2) | D(7,3) | D(7,4) | D(7,5) | |
| L8 | D(8,1) | D(8,2) | D(8,3) | D(8,4) | D(8,5) | |
| L9 | D(9,1) | D(9,2) | D(9,3) | D(9,4) | D(9,5) | |
| L10 | D(10,1) | D(10,2) | D(10,3) | D(10,4) | D(10,5) | |
| L11 | D(11,1) | D(11,2) | D(11,3) | D(11,4) | D(11,5) | |
| L12 | D(12,1) | D(12,2) | D(12,3) | D(12,4) | D(12,5) | | p_pre

RADIATION IMAGE CAPTURING SYSTEM AND CONSOLE

CROSS REFERENCE TO RELATED APPLICATIONS

The present invention claims priority under 35 U.S.C. §119 to Japanese Application No. 2012-075831 filed Mar. 29, 2012, the entire content of which is incorporated herein by reference.

BACKGROUND

1. Field of the Invention

The present invention relates to a radiation image capturing system and a console, and particularly, relates to a radiation image capturing system that performs capturing by using a radiation image capturing apparatus, and displays a preview image on the console based on data transmitted from the radiation image capturing apparatus.

2. Description of Related Art

There have been developed a variety of radiation image capturing apparatuses such as: a so-called direct-type radiation image capturing apparatus that generates electric charges in detection elements according to a dose of an irradiated radiation such as an X-ray, and converts the electric charges into electric signals; and a so-called indirect-type radiation image capturing apparatus that converts the irradiated radiation into electromagnetic waves with another wavelength, such as visible light, by a scintillator and the like, thereafter, generates electric charges by photoelectric conversion elements such as photodiodes according to energy of the electromagnetic waves thus converted and irradiated, and converts the generated electric charges into electric signals (that is, image data). Note that, in the present invention, the detection elements in the direct-type radiation image capturing apparatus and the photoelectric conversion elements in the indirect-type radiation image capturing apparatus are collectively referred to as radiation detection elements.

This type of radiation image capturing apparatus is known as a flat panel detector (FPD), and heretofore, has been composed as a so-called dedicated type integrally formed with a supporting table (for example, refer to Japanese Patent Application Laid-Open Publication No. H09-73144). However, in recent years, a portable-type radiation image capturing apparatus, which has radiation detection elements and the like housed in a cabinet thereof, and is made portable, has been developed and put into practical use (for example, refer to Japanese Patent Application Laid-Open Publication No. 2006-058124 and Japanese Patent Application Laid-Open Publication H06-342099).

Usually, the radiation image capturing apparatus is composed in such a manner that a plurality of radiation detection elements 7 are arrayed in a two-dimensional shape (matrix shape) on a detection unit P, and that switch units formed of thin film transistors (hereinafter, referred to as TFTs) 8 are each connected to the respective radiation detection elements 7.

Then, usually, radiation image capturing is performed in such a manner that the radiation is irradiated onto the radiation image capturing apparatus from a radiation source of a radiation generation device through a body or the like of a capturing target person, that is, a subject. Then, after the capturing, an ON voltage is applied from a gate driver 15b sequentially to the respective lines L1 to Lx of scanning lines 5, the respective TFTs 8 are sequentially turned to an ON state, the electric charges generated and accumulated in the respective radiation detection elements 7 by the irradiation of the radiation are sequentially discharged to the respective signal lines 6, and the discharged electric charges are each read out as image data D in the respective readout circuits 17.

Incidentally, in the conventional radiation image capturing system using the radiation image capturing apparatus as described above, the radiation image capturing has been performed by transferring signals between the radiation image capturing apparatus and the radiation generation device. However, for example, in such a case where manufacturers of the radiation image capturing apparatus and the radiation generation device are different from each other, it is not always easy to construct an interface therebetween, or alternatively, the interface cannot be constructed.

In such a case, when viewed from the radiation image capturing apparatus side, it is not understood at which timing the radiation is to be irradiated from the radiation source. Therefore, in such a case, it is necessary that the radiation image capturing apparatus be configured so as to be capable of detecting that the radiation is irradiated from the radiation source by the apparatus itself. Then, there are developed a variety of such radiation image capturing apparatuses, each of which is capable of detecting a start of the radiation irradiation by the radiation image capturing apparatus itself and then capable of performing the capturing as described above.

For example, in the inventions described in U.S. Pat. No. 7,211,803 and Japanese Patent Application Laid-Open Publication No. 2009-219538, the following is proposed. When the radiation irradiation onto the radiation image capturing apparatus is started and the electric charges are generated in the respective radiation detection elements 7, the electric charges flow out from the respective radiation detection elements 7 to bias lines 9 (refer to FIG. 3 and the like, which will be described later) connected to the respective radiation detection elements 7, and currents flowing through the bias lines 9 are increased. By using this phenomenon, values of the currents flowing through the bias lines 9 are detected by providing a current detecting unit in the bias lines 9, and based on the values of the currents, the start of the radiation irradiation, and the like are detected.

Moreover, the inventors of the present invention repeated a variety of researches for other methods of detecting the irradiation of the radiation by the radiation image capturing apparatus itself. As a result, the inventors were able to find out some methods capable of accurately detecting the irradiation of the radiation by the radiation image capturing apparatus itself (for example, refer to Pamphlet of International Publication No. WO2011/135917, and Pamphlet of International Publication No. WO2011/152093). These new detection methods will be described later in detail.

Then, the radiation image capturing system using the radiation image capturing apparatus as described above is frequently configured so as to extract data for a preview image (hereinafter, preview image data) from among image data D captured by the radiation image capturing apparatus and transmit the extracted data to a console 58 (refer to FIGS. 6 and 7 to be described later) in order to confirm whether or not the subject is appropriately captured by the radiation image capturing apparatus.

In that case, the console 58 is configured, when the preview image data is transmitted thereto from the radiation image capturing apparatus, so as to create a preview image based on the transmitted preview image, and to display the preview image on a display unit thereof. Then, an operator such as a radiographer confirms the preview image concerned, and determines whether or not re-capturing is necessary, and so on.

Incidentally, in the case of configuring the radiation image capturing apparatus so as to detect the start of the radiation irradiation by itself as described above, since the interface is not constructed with the radiation generation device, a state where the radiation irradiation is started is brought during a period while reset processing for the respective radiation detection elements 7 and later-described readout processing for image data d for detecting the start of the irradiation are performed before the radiation image capturing in the radiation image capturing apparatus.

Therefore, in some cases, the radiation irradiation is started at the point of time when the ON voltage is applied to a scanning line 5 in a portion other than a terminal end portion of a detection unit P in which the radiation detection elements 7 are two-dimensionally arrayed, and when the reset processing for the respective radiation detection elements 7, and the like are performed.

Then, in such a case, for the purpose of equalizing a time of leaving the respective TFTs 8 in an OFF state (that is, the time is an effective accumulation time Tac (refer to FIG. 15 to be described later) among the respective scanning lines 5 before performing the readout processing for the image data D, a configuration is sometimes adopted so that the readout processing for the image data D can be performed not by starting the application of the ON voltage from the scanning line 5 (for example, a line L1 or Lx of the scanning line 5 in FIG. 3) at the terminal end portion of the detection unit P, but by starting the application of the ON voltage from a scanning line 5 to which the ON voltage should be applied after a scanning line 5 to which the ON voltage is applied at the point of time when the start of the radiation irradiation is detected or immediately before the point of time concerned.

However, the following is gradually found out. In the case of adopting such a configuration, if the preview image data is not processed appropriately, then as shown in FIG. 23 for example, a brightness difference sometimes appears at a portion of such a scanning line 5 (hereinafter, referred to as a readout starting line Ls) to which the ON voltage is first applied at the point of time when the readout processing for the image data D is started, the portion belonging to the created and displayed preview image p_pre.

Then, when the brightness difference as described above appears in the preview image p_pre, there occurs a problem that it becomes difficult to carry out confirmation work for the preview image p_pre, which is as described above, by the operator such as the radiographer, and determination processing as to whether or not the re-capturing is necessary, the determination processing being based on the confirmation work.

Moreover, in the case of performing image correction, which is precise and requires labor, in order to perform image correction for the brightness difference that appears in the preview image p_pre, there is also a problem that, since it takes time to display the preview image p_pre subjected to the image correction an operator's request that the preview image p-pre be confirmed earlier and the determination as to whether or not the re-capturing is necessary be thereby performed earlier becomes unsatisfied.

SUMMARY

The present invention has been made in consideration of the above-described point. It is an object of the present invention to provide a radiation image capturing system that, in the case of detecting the start of the radiation irradiation by the radiation image capturing apparatus itself, is capable of appropriately and simply performing the image correction for the brightness difference that can occur in the preview image and capable of displaying early the preview image subjected to the image correction, and to provide a console.

In order to achieve any one of the above advantages, according to an aspect of the present invention, there is provided a radiation image capturing system and a console, the radiation image capturing system including:

a radiation image capturing apparatus including:
 a plurality of scanning lines and a plurality of signal lines, both of the lines arranged to intersect each other;
 a plurality of radiation detection elements arrayed two-dimensionally;
 a scan drive unit which switches a voltage to be applied to the scanning lines between an ON voltage and an OFF voltage;
 switch units connected to the scanning lines, the switch units to discharge electric charge accumulated in the radiation detection elements to the signal lines when the ON voltage is applied;
 a readout circuit which reads out the electric charge discharged to the signal lines; and
 a control unit which detects a start of radiation irradiation based on data to be changed by the radiation irradiation, sets a scanning line from which readout of image data is started from timing at a time of the detection, starts application of the ON voltage from the set scanning line to read out the image data, and generates preview image data from the readout image data; and a console which displays a preview image based on the preview image data transmitted from the radiation image capturing apparatus and information regarding the scanning line from which the readout of the image data is started, wherein the console holds in advance a relationship between a number of the scanning line in a case where the radiation image capturing apparatus sets, as a starting point, the scanning line from which readout of the image data is started and an offset amount superimposed on the image data to be read out, and when the preview image is displayed, based on the information regarding the scanning line from which the readout of the image data is started, modifies the relationship to a form in which the starting point is moved to a position of the scanning line from which the radiation image capturing apparatus actually starts the readout of the image data, calculates the offset amount for each of the scanning lines, and generates and displays the preview image based on a value obtained by subtracting the offset amount from the corresponding preview image data.

BRIEF DESCRIPTION OF THE DRAWINGS

The present invention will become more fully understood from the detailed description given hereinbelow and the appended drawings, and thus are not intended to define the limits of the present invention, and wherein;

FIG. 6 is a view showing a configuration example of a radiation image capturing system according to this embodiment, which is constructed in a capturing room and the like;

FIG. 9 is a timing chart showing ON/OFF timing of the electric charge resetting switch and the TFT in readout processing for the leaked data;

FIG. 10 is a graph showing an example of a time shift of the leaked data to be read out;

FIG. 15 is a timing chart explaining timing of applying the ON voltage to the respective scanning lines in detection processing for a start of radiation irradiation and readout processing for an electric charge accumulation state and image data in a case where Detection Method 1 is adopted, and the like;

FIG. 17 is a table explaining an example of a way of extracting preview image data from the image data;

DETAILED DESCRIPTION OF THE PREFERRED EMBODIMENTS

A description is made below of embodiments of a radiation image capturing system according to the present invention with reference to the drawings.

Note that, as a radiation image capturing apparatus for use in the radiation image capturing system, a so-called indirect-type radiation image capturing apparatus is described below, which includes a scintillator and the like, and converts an irradiated radiation into electromagnetic waves with another wavelength, such as visible light, and obtains electric signals; however, the present invention can also be applied to a so-called direct-type radiation image capturing apparatus that directly detects the radiation by radiation detection elements without passing the radiation concerned through the scintillator and the like.

Moreover, though the description is made of the case where the radiation image capturing apparatus is a so-called portable type, the present invention is also applicable to a so-called dedicated-type radiation image capturing apparatus, which is integrally formed with a supporting table.

[Radiation Image Capturing Apparatus]

Figure 1:
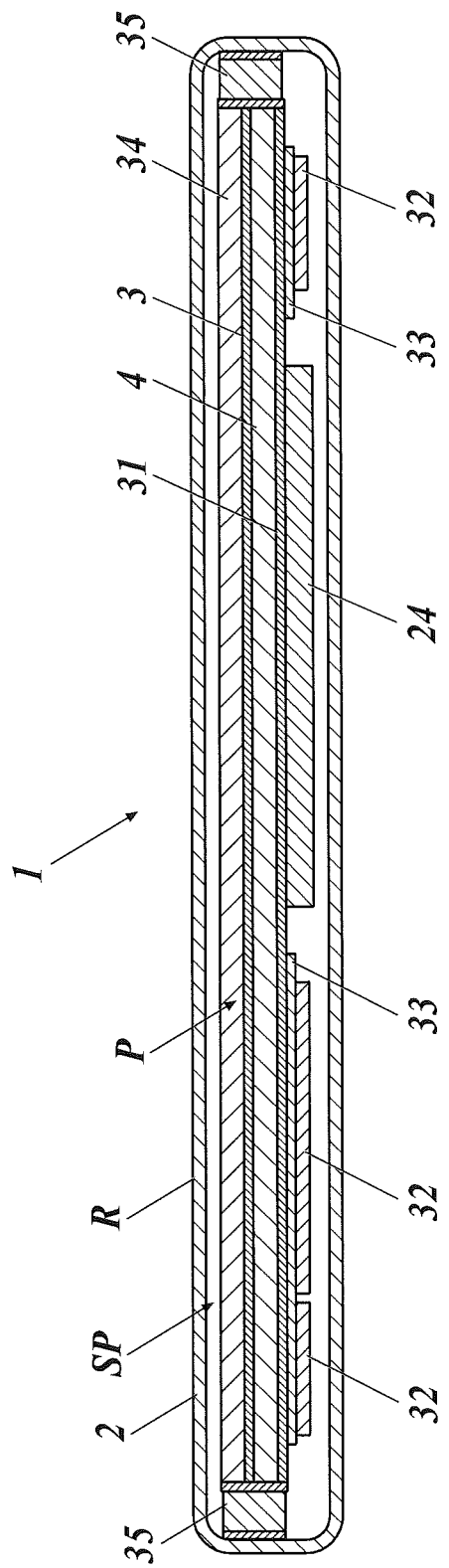
FIG. 1 is a cross-sectional view of a radiation image capturing apparatus.
Figure 2:
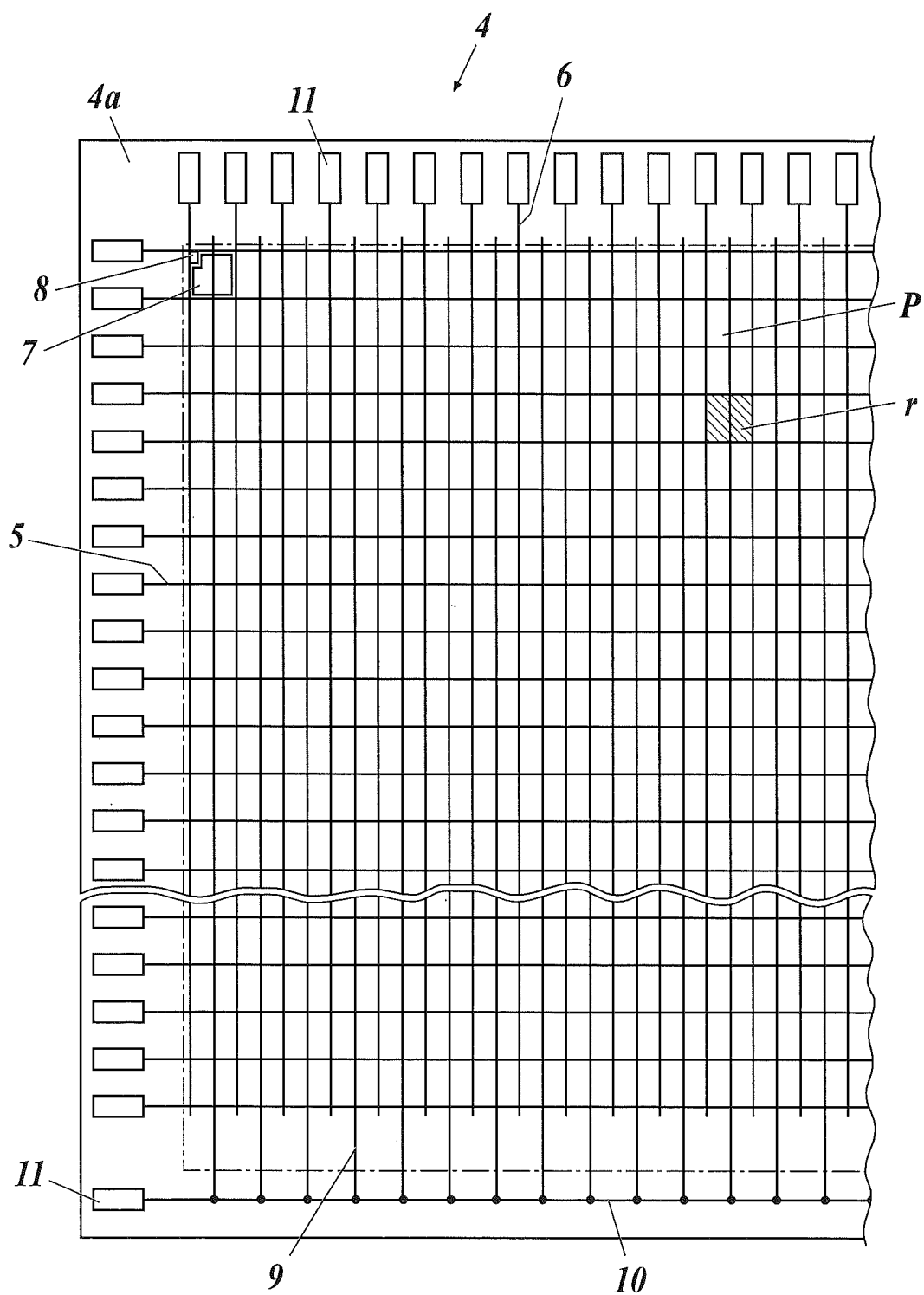
FIG. 2 is a plan view showing a configuration of a board of the radiation image capturing apparatus.

First, a description is made of a configuration and the like of the radiation image capturing apparatus for use in the radiation image capturing system according to this embodiment. FIG. 1 is a cross-sectional view of the radiation image capturing apparatus according to this embodiment, and FIG. 2 is a plan view showing a configuration of a board of the radiation image capturing apparatus.

As shown in FIG. 1, a radiation image capturing apparatus 1 is configured in such a manner that a sensor panel SP composed of a scintillator 3, a board 4 and the like are housed in a cabinet 2 formed of a carbon plate or the like, which has a radiation incident surface R as a surface on a side on which the radiation is to be irradiated.

Moreover, though not shown in FIG. 1, in this embodiment, in the cabinet 2, an antenna device 41 (refer to FIG. 3 to be described later) is provided, which is a communication unit that transmits image data D and the like by a wireless method to a console 58 (refer to FIG. 6 and FIG. 7) to be described later.

Moreover, though not shown in FIG. 1, in this embodiment, the radiation image capturing apparatus 1 includes a connector on a side surface and the like of the cabinet 2, and is made capable of transmitting signals, data and the like to the console 58 and the like through the connector by a wired method. Therefore, this connector is configured to function also as the communication unit of the radiation image capturing apparatus 1.

As shown in FIG. 1, in an inside of the cabinet 2, a base stage 31 is arranged, and the board 4 is provided on the radiation incident surface R side (hereinafter, simply referred to as an upper surface side) of the base stage 31 through a thin lead plate (not shown) and the like. Then, on the upper surface side of the board 4, the scintillator 3 that converts the irradiated radiation into light such as the visible light is provided on a scintillator substrate 34, and the scintillator 3 is provided in a state of being opposite to the board 4 side.

Moreover, onto a lower surface side of the base stage 31, there are attached: a PCB board 33, on which electronic components 32 and the like are arranged; a battery 24; and the like. In such a manner as described above, the sensor panel SP is formed of the base stage 31, the board 4 and the like. Furthermore, in this embodiment, a buffer material 35 is provided between the sensor panel SP and a side surface of the cabinet 2.

In this embodiment, the board 4 is composed of a glass substrate, and as shown in FIG. 2, on the upper surface (that is, a surface opposite to the scintillator 3) 4a of the board 4, a plurality of scanning lines 5 and a plurality of signal lines 6 are arranged so as to intersect each other. Moreover, on each of small regions r partitioned by the plurality of scanning lines 5 and the plurality of signal lines 6 on the surface 4a of the board 4, a radiation detection element 7 is provided.

As described above, the whole of the small regions r, on which the plurality of radiation detection elements 7 arranged two-dimensionally (in a matrix fashion) on the respective small regions r partitioned by the scanning lines 5 and the signal lines 6 are provided, that is, a region shown by an alternate long and short dashed line in FIG. 2 is defined as a detection unit P. In this embodiment, a photodiode is used as each of the radiation detection elements 7, and alternatively, for example, a phototransistor or the like is also usable.

Figure 3:
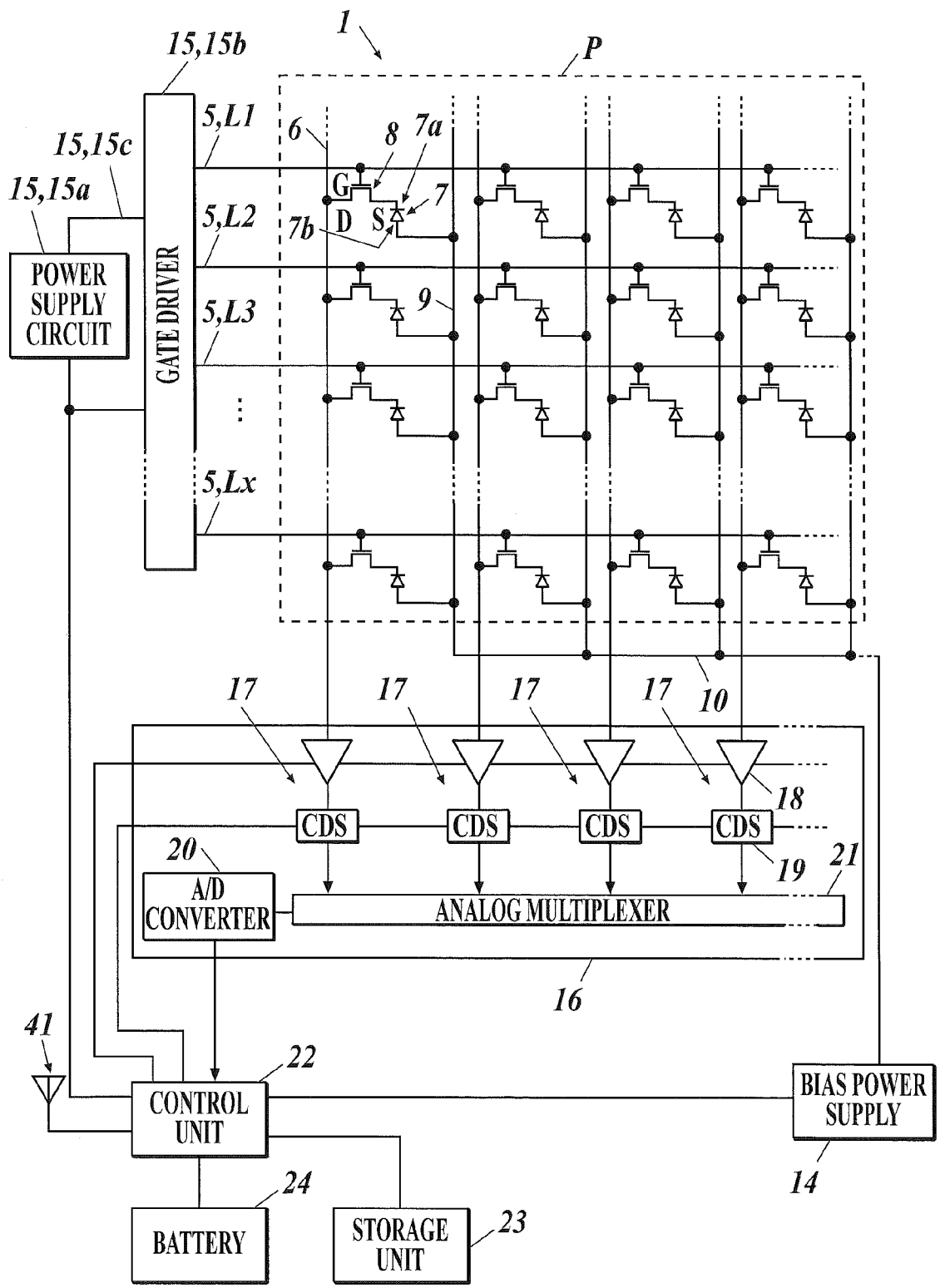
FIG. 3 is a block diagram showing an equivalent circuit of the radiation image capturing apparatus.
Figure 4:
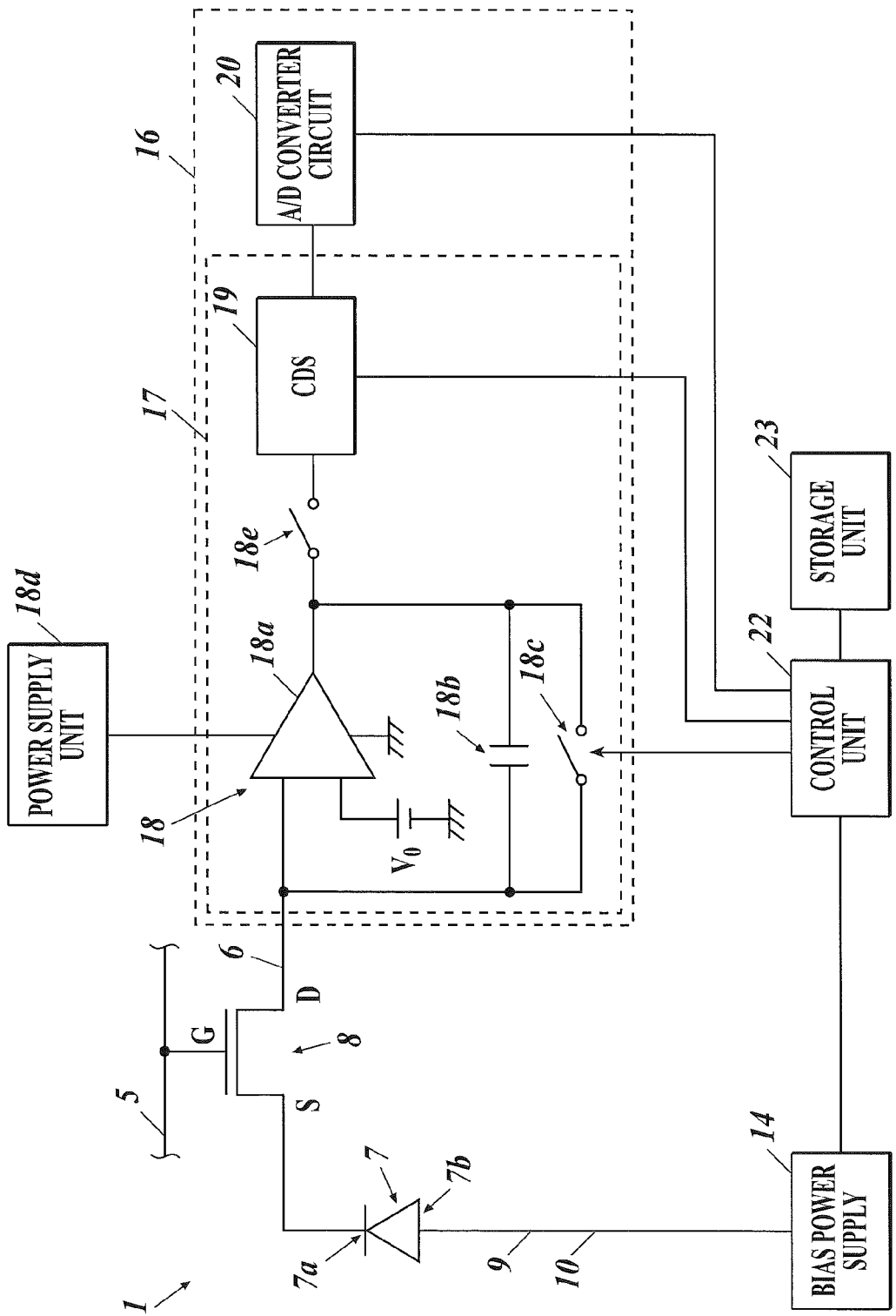
FIG. 4 is a block diagram showing an equivalent circuit for an amount of one pixel that composes a detection unit.

Here, a description is made of a circuit configuration of the radiation image capturing apparatus 1. FIG. 3 is a block diagram showing an equivalent circuit of the radiation image capturing apparatus 1 according to this embodiment, and FIG. 4 is a block diagram showing an equivalent circuit for an amount of one pixel that composes the detection unit P.

To a first electrode 7a of each radiation detection element 7, a source electrode 8s (refer to reference symbol "S" of FIG. 3 and FIG. 4) of a TFT 8 as a switch unit is connected. Moreover, a drain electrode 8d and gate electrode 8g (refer to reference symbols "D" and "G" of FIG. 3 and FIG. 4) of the TFT 8 are connected to the signal line 6 and the scanning line 5, respectively.

Then, when an ON voltage is applied to the gate electrode 8g through the scanning line 5 from a scan drive unit 15 to be described later, the TFT 8 turns to an ON state, and discharges the electric charges, which are accumulated in the radiation detection element 7, to the signal line 6 through the source electrode 8s and the drain electrode 8d. Moreover, when an OFF voltage is applied to the gate electrode 8g through the scanning line 5, the TFT 8 turns to an OFF state, stops discharging the electric charges from the radiation detection element 7 to the signal line 6, and accumulates the electric charges in the radiation detection element 7.

Moreover, in this embodiment, as shown in FIG. 2 and FIG. 3, on the board 4, bias lines 9 are connected to second electrodes 7b of the respective radiation detection elements 7 in a ratio of one to one column of the respective radiation detection elements 7 concerned, and the respective bias lines 9 are bundled to a connection line 10 at an outside position of the detection unit P of the board 4. Then, the connection line 10 is connected to a bias power supply 14 (refer to FIG. 3 and FIG. 4) through an input/output terminal 11 (also referred to as a pad; refer to FIG. 2), and a reverse bias voltage is applied from the bias power supply 14 to the second electrodes 7b of the respective radiation detection elements 7 through the connection line 10 and the respective bias lines 9.

Meanwhile, the respective scanning lines 5 are each connected to the gate driver 15b of the scan drive unit 15 through such input/output terminals 11. In the scan drive unit 15, the ON voltage and the OFF voltage are supplied from a power supply circuit 15a through a wire 15c to the gate driver 15b, and by the gate driver 15b, a voltage to be applied to the respective lines L1 to Lx of the scanning lines 5 is switched between the ON voltage and the OFF voltage.

Moreover, the respective signal lines 6 are each connected through the respective input/output terminals 11 to the respective readout circuits 17 built in a readout IC 16. In this embodiment, each of the readout circuits 17 is mainly composed of an amplifier circuit 18, a correlated double sampling circuit 19 and the like. In the readout IC 16, an analog multiplexer 21 and an A/D converter 20 are further provided. Note that, in FIG. 3 and FIG. 4, the correlated double sampling circuit 19 is represented as CDS.

In this embodiment, each of the amplifier circuits 18 is composed of a charge amplifier circuit including: an operational amplifier 18a; and a power supply unit 18d, which has a capacitor 18b and an electric charge resetting switch 18c each connected in parallel to the operational amplifier 18a, and supplies electric power to the operational amplifier 18a and the like. Then, each of the signal lines 6 is connected to an input-side inversion input terminal of the operational amplifier 18a of the amplifier circuit 18, and a reference potential $V_0$ is applied to an input-side non-inversion input terminal of the amplifier circuit 18.

Moreover, the electric charge resetting switch 18c of the amplifier circuit 18 is connected to a control unit 22, and ON/OFF thereof is controlled by the control unit 22. Moreover, between the operational amplifier 18a and the correlated double sampling circuit 19, a switch 18e is provided, which opens and closes in conjunction with the electric charge resetting switch 18c. The switch 18e performs ON/OFF operations in conjunction with ON/OFF operations of the electric charge resetting switch 18c.

Figure 5:
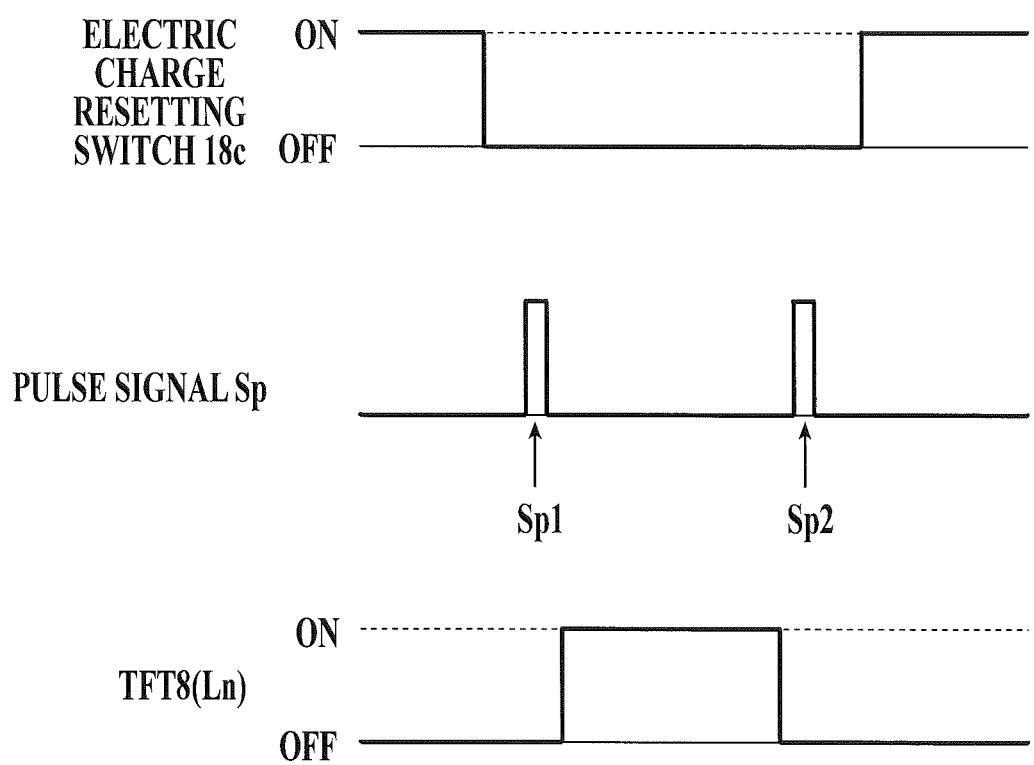
FIG. 5 is a timing chart showing ON/OFF timing of an electric charge resetting switch, a pulse signal and a TFT in readout processing for image data.

In the event of the readout processing for the image data D from each of the radiation detection elements 7, as shown in FIG. 5, the ON voltage is applied to the TFT 8 of each radiation detection element 7 in a state where the electric charge resetting switch 18c of the amplifier circuit 18 is left in the OFF state, whereby the TFT 8 is turned to the ON state. Then, the electric charges are each discharged to the signal line 6 from the inside of each of the radiation detection elements 7, and flow into and are accumulated in the capacitor 18b of the amplifier circuit 18 of each readout circuit 17. Then, in the amplifier circuit 18, a voltage value corresponding to an amount of the electric charges accumulated in the capacitor 18b is outputted from an output side of the operational amplifier 18a.

The correlated double sampling circuit 19 outputs an increment of an output value from the amplifier circuit 18, which is obtained before and after the electric charges flow thereinto from each radiation detection element 7, as analog image data D to a downstream side. Then, the respective pieces of the outputted image data D are sequentially transmitted to the A/D converter 20 through the analog multiplexer 21, and are sequentially converted into digital image data D by the A/D converter 20, are outputted to a storage unit 23, and are sequentially stored therein. In such a manner as described above, the readout processing for the image data D is performed.

The control unit 22 is composed of: a computer in which a CPU (Central Processing Unit), a ROM (Read Only Memory), a RAM (Random Access Memory (RAM), an input/output interface and the like, which are not shown, are connected to a bus; an FPGA (Field Programmable Gate Array); and the like. The control unit 22 may be composed of a dedicated control circuit.

Then, the control unit 22 controls operations of the respective functional units of the radiation image capturing apparatus 1. For example, the control unit 22 controls the scan drive unit 15, the readout circuit 17 and the like to perform the readout processing for the image data D as described above. Moreover, as shown in FIG. 3 and FIG. 4, to the control unit 22, the storage unit 23 composed of an SRAM (Static RAM), an SDRAM (Synchronous DRAM) and the like is connected.

Moreover, in this embodiment, the above-mentioned antenna device 41 is connected to the control unit 22, and moreover, a battery 24 is connected thereto, the battery 24 supplying electric power necessary for the respective functional units such as the scan drive unit 15, the readout circuit 17, the storage unit 23, and the bias power supply 14.

Note that a configuration, control and the like for detection processing for a start of the radiation irradiation in the radiation image capturing apparatus 1 are described after describing a configuration and the like of a radiation image capturing system 50 according to this embodiment.

[Radiation Image Capturing System]

Figure 6:
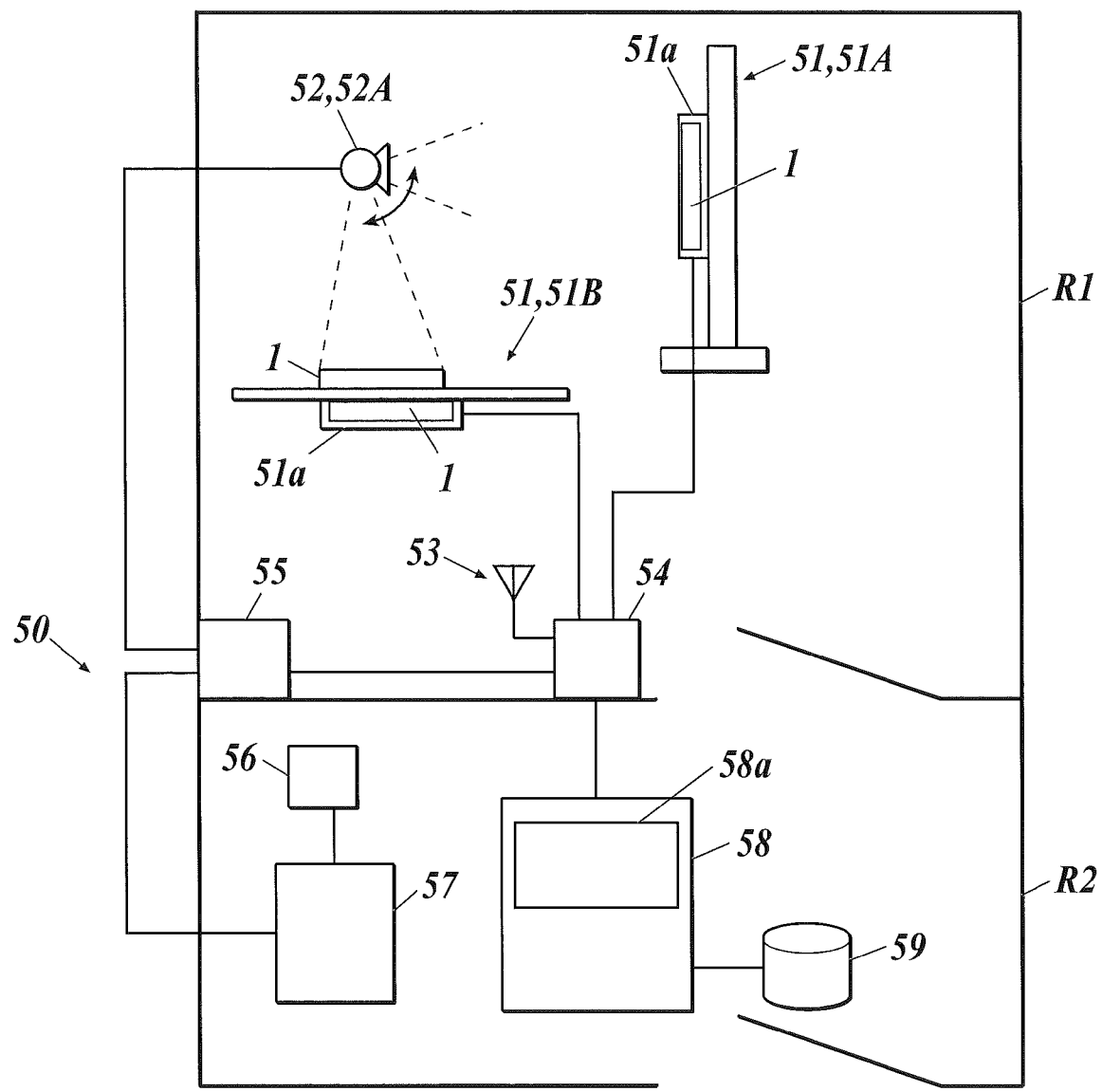

Next, a description is made of the configuration and the like of the radiation image capturing system 50 according to this embodiment. FIG. 6 is a view showing a configuration example of the radiation image capturing system 50 according to this embodiment. FIG. 6 shows the case where the radiation image capturing system 50 is constructed in a capturing room R1.

In the capturing room R1, a capturing platform 51 is placed, and the capturing platform 51 is configured so as to be capable of loading and using the above-described radiation image capturing apparatus 1 in a cassette holding portion (also referred to as a cassette holder) 51a thereof. Note that, though FIG. 6 shows the case where a capturing platform 51A for standing position capturing and a capturing platform 51B for lying position capturing are placed as such capturing platforms 51, only either one of the capturing platforms 51 may be provided for example.

As shown in FIG. 6, in the capturing room R1, at least one radiation source 52A is provided, which irradiates the radiation through the subject onto the radiation image capturing apparatus 1 loaded in the capturing platforms 51. In this embodiment, a position of the radiation source 52A is moved, and an irradiation direction of the radiation is changed, whereby it is made possible to irradiate the radiation onto both of the capturing platform 51A for the standing position capturing and the capturing platform 51B for the lying position capturing.

In the capturing room R1, there is provided a relay (also referred to as a base station and the like) 54 for relaying communication and the like among the respective devices in the capturing room R1, the respective devices outside of the capturing room R1, and the like. Note that, in this embodiment, a wireless antenna (also referred to as an access point) 53 is provided in the relay 54 so that the radiation image capturing apparatus 1 can perform transmission/reception of the image data D, the signals and the like by a wireless method.

Moreover, the relay 54 is connected to a radiation generation device 55 and the console 58, and incorporates therein a converter (not shown) that converts signals and the like for LAN (Local Area Network) communication, which are to be transmitted to the radiation generation device 55 from the radiation image capturing apparatus 1, the console 58 and the like, into signals and the like for the radiation generation device 55, and performs conversion inverse to such conversion as described above.

In this embodiment, in a front room (also referred to as an operation room and the like) R2, an operation console 57 for the radiation generation device 55 is provided. On the operation console 57, there is provided an exposure switch 56 for allowing the operator such as the radiographer to operate the same and instruct the radiation generation device 55 to start the radiation irradiation, and so on. When the exposure switch 56 is operated by the operator, the radiation generation device 55 irradiates the radiation from the radiation source 52. Moreover, by the operation console 57, a variety of controls are performed such that the radiation source 52 is adjusted so that a radiation with an appropriate dose can be irradiated.

As shown in FIG. 6, in this embodiment, the console 58 composed of a computer and the like is provided in the front room R2. Note that it is also possible to provide the console 58 outside of the capturing room R1 and the front room R2, in a room other than the capturing room R1 and the front room R2, and so on, and the console 58 is placed at an appropriate place.

Moreover, in the console 58, a display unit 58a is provided, which is composed by including a CRT (Cathode Ray Tube), an LCD (Liquid Crystal Display) or the like, and in addition, the console 58 includes input units such as a mouse and a keyboard (not shown). Moreover, the console 58 has a storage unit 59 connected thereto or incorporated therein, the storage unit 59 being composed of an HDD (Hard Disk Drive) and the like.

Figure 7:
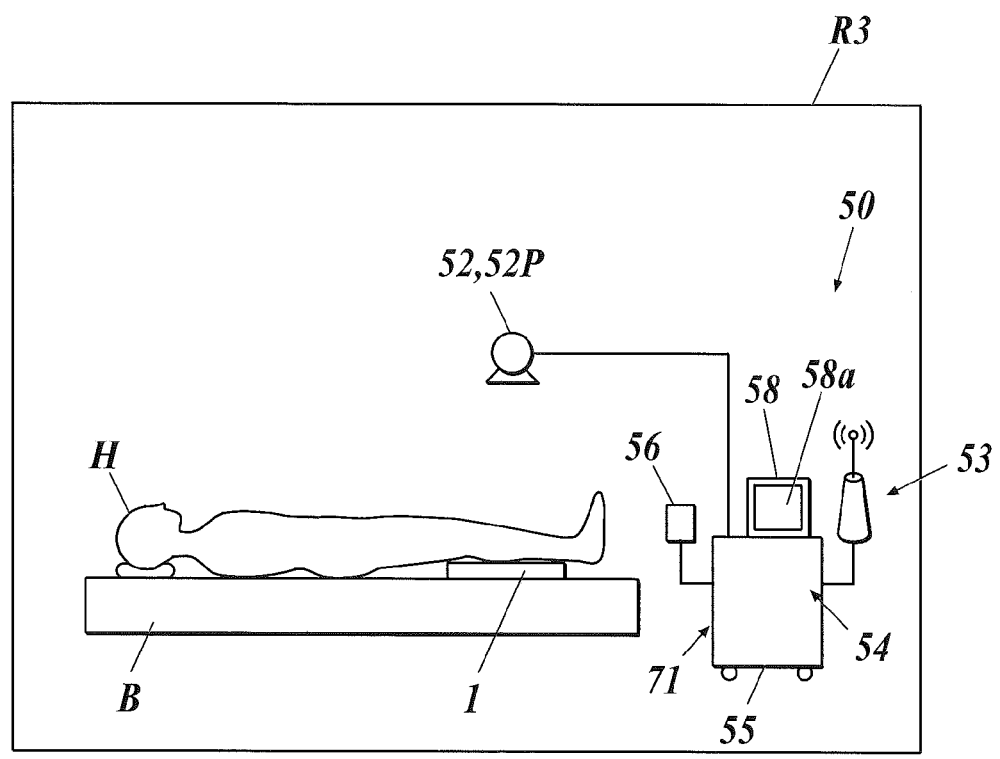
FIG. 7 is a view showing a configuration example of a radiation image capturing system according to this embodiment, which is constructed on a diagnosis carriage.

Meanwhile, as shown in FIG. 7, the radiation image capturing apparatus 1 is also configured to be usable without being loaded in the capturing platform 51, that is, in a so-called independent state. For example, in such a case where a patient H cannot go to the capturing room R1 since the patient H cannot rise up from a bed B of a sickroom R3, then as shown in FIG. 7, the radiation image capturing apparatus 1 can be brought into the sickroom R3, and can be used by being inserted between the bed B and a patient's body or by being applied to the patient's body.

Moreover, in the case of using the radiation image capturing apparatus 1 in the sickroom R3 and the like, then in place of the above-mentioned radiation generation device 55 installed in the capturing room R1, as shown in FIG. 7, a so-called portable radiation generation device 55 is mounted, for example, on a diagnosis carriage 71, and is brought into the sickroom R3. In this case, a radiation source 52P of the portable radiation generation device 55 is composed so as to be capable of irradiating the radiation in an arbitrary direction. The radiation source 52P can irradiate the radiation onto the radiation image capturing apparatus 1, which is inserted between the bed B and the patient's body or applied to the patient's body, at an appropriate distance and in an appropriate direction.

Moreover, in this case, a relay 54 provided with a wireless antenna 53 is incorporated in the radiation generation device 55, and in a similar way to the above, the relay 54 relays the communication between the radiation generation device 55 and the console 58, the communication between the radiation image capturing apparatus 1 and the console 58, the transmission of the image data D therebetween, and the like.

Note that, as shown in FIG. 6, it is also possible to use the radiation image capturing apparatus 1 by insertion thereof between the body of the patient (not shown) who lies on the capturing platform 51B for the lying position capturing in the capturing room R1 and the capturing platform 51B for the lying position capturing concerned or by application thereof to such a patient's body on the capturing platform 51B for the lying position capturing concerned. In that case, it is possible to use any of the portable radiation source 52P and the radiation source 52A installed in the capturing room R1.

In this embodiment, the console 58 functions as an image processing apparatus. When the image data D and the like are transmitted from the radiation image capturing apparatus 1, then based on these, the console 58 carries out precise image processing such as offset correction, gain correction, defective pixel correction, and gradation processing corresponding to a captured region and generates the radiation image.

Moreover, upon receiving preview image data Dt transmitted from the radiation image capturing apparatus 1 as will be described later, the console 58 displays the preview image p_pre on a display unit 58a based on the received preview image data Dt. This display will be described later in detail.

[Regarding Detection Method for Start of Radiation Irradiation]

Next, a description is made of the detection methods for the start of the radiation irradiation in the radiation image capturing apparatus 1 according to this embodiment.

In this embodiment, as mentioned above, such a configuration is adopted so that the radiation irradiation from the radiation source of the radiation generation device can be detected by the radiation image capturing apparatus 1 itself without constructing the interface between the radiation image capturing apparatus 1 and the radiation generation device 55 (refer to FIG. 6 and FIG. 7). Then, as the detection methods for the start of the radiation irradiation, for example, it is possible to adopt the detection methods described in Pamphlet of International Publication No. WO2011/135917 and Pamphlet of International Publication No. WO2011/152093, which are mentioned above. A description is briefly made below of these detection methods.

[Detection Method 1]

Detection Method 1 is a detection method described in the above-mentioned Pamphlet of International Publication No. WO2011/135917. For details of this Detection Method 1, refer to this literature.

Figure 8:
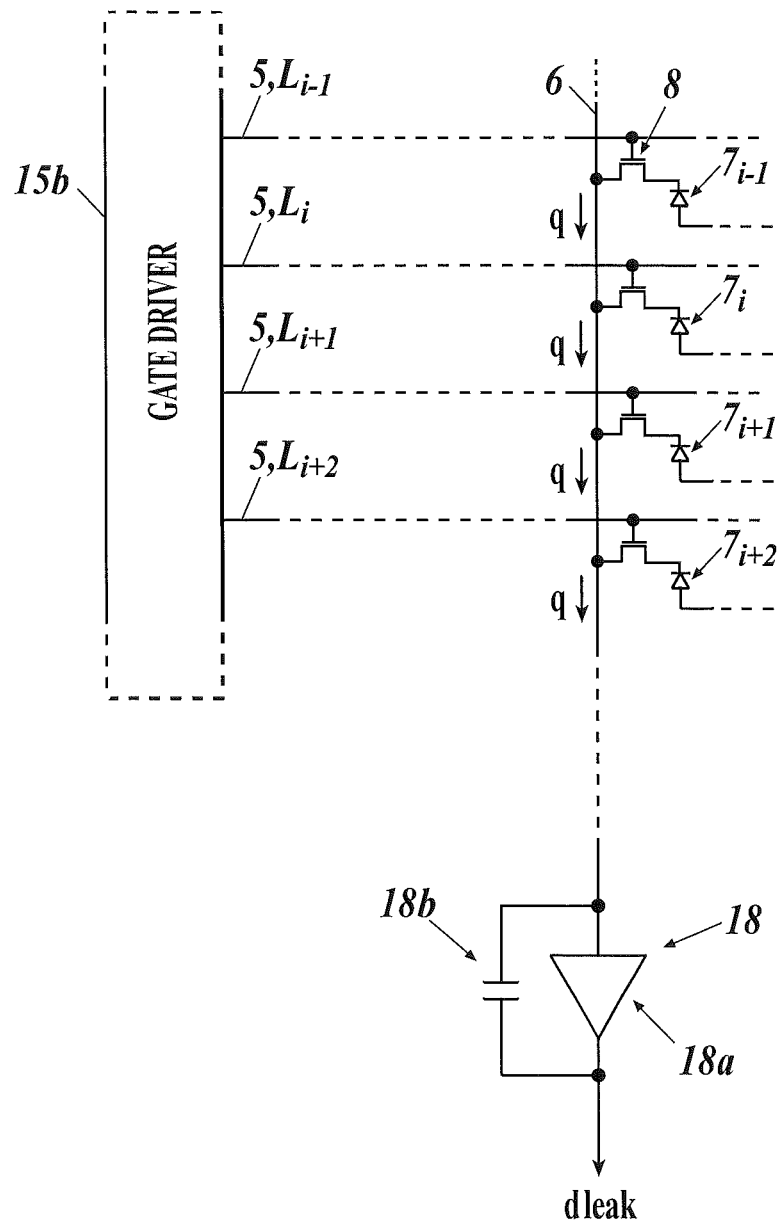
FIG. 8 is a view explaining that the respective electric charges leaked through the TFTs from the respective radiation detection elements are read out as leaked data in Detection Method 1.

In this Detection Method 1, the control unit 22 of the radiation image capturing apparatus 1 is configured to repeatedly perform readout processing for leaked data dleak before the capturing of the radiation image. As shown in FIG. 8, the leaked data dleak is data equivalent to a total value of electric charges q for each of the signal lines 6, the electric charges q being leaked from the respective radiation detection elements 7 through the respective TFTs 8 of the OFF state in a state where the OFF voltage is applied to the respective scanning lines 5.

Then, in readout processing for the leaked data dleak, as shown in FIG. 9, in a state where the OFF voltage is applied to the respective lines L1 to Lx of the scanning lines 5 to turn the respective TFTs 8 to the OFF state, pulse signals Sp1 and Sp2 are transmitted from the control unit 22 to the correlated double sampling circuits 19 (refer to CDSs in FIG. 3 and FIG. 4) of the respective readout circuits 17, and the leaked data dleak is read out.

In this case, unlike the case of the readout processing (refer to FIG. 5) for the image data d for detecting the start of the radiation, the ON voltage is not applied from the gate driver 15b to the respective scanning lines 5. A total value of the electric charges q for each of the signal lines 6 is read out as the leaked data dleak, the electric charges q being accumulated in the capacitors 18b of the amplifier circuits 18 during a period from the point of time when the pulse signal Sp1 is transmitted from the control unit 22 to the correlated double sampling circuits 19 until the pulse signal Sp2 is transmitted, and being leaked from the respective radiation detection elements 7 through the respective TFTs 8.

In the case of adopting the configuration so as to read out the leaked data dleak as described above, when the radiation irradiation onto the radiation image capturing apparatus 1 is started, the electromagnetic waves converted from the radiation by the scintillator 3 (refer to FIG. 1) are irradiated onto the respective TFTs 8, whereby the electric charges q (refer to FIG. 8) to be leaked from the respective radiation detection elements 7 through the respective TFTs 8 are then increased. This phenomenon was discovered by the research of the inventors of the present invention.

Therefore, when the radiation is irradiated onto the radiation image capturing apparatus 1, the electric charges q to be leaked from the respective radiation detection elements 7 through the respective TFTs 8 are increased. Accordingly, as shown in FIG. 10, a value of the leaked data dleak to be read out becomes larger than values of the leaked data dleak read out previously (refer to a time t1 of FIG. 6). As described above, in Detection Method 1, the value of the leaked data dleak to be read out is changed by the fact that the radiation is irradiated.

Accordingly, by using this, for example as shown in FIG. 10, it is possible to adopt a configuration so as to preset a threshold value dleak_th for the leaked data dleak and to detect the start of the radiation irradiation onto the radiation image capturing apparatus 1 at the point of time when the read leaked data dleak exceeds the threshold value dleak-th.

Note that, in this Detection Method 1, the readout processing for the leaked data dleak is performed in the state where the respective TFTs 8 are turned to the OFF state as described above. Then, when the respective TFTs 8 are left in the OFF state, a state is brought where dark electric charges (also referred to as dark currents and the like) generated in the respective radiation detection elements 7 continue to be accumulated in the respective radiation detection elements 7.

Figure 11:
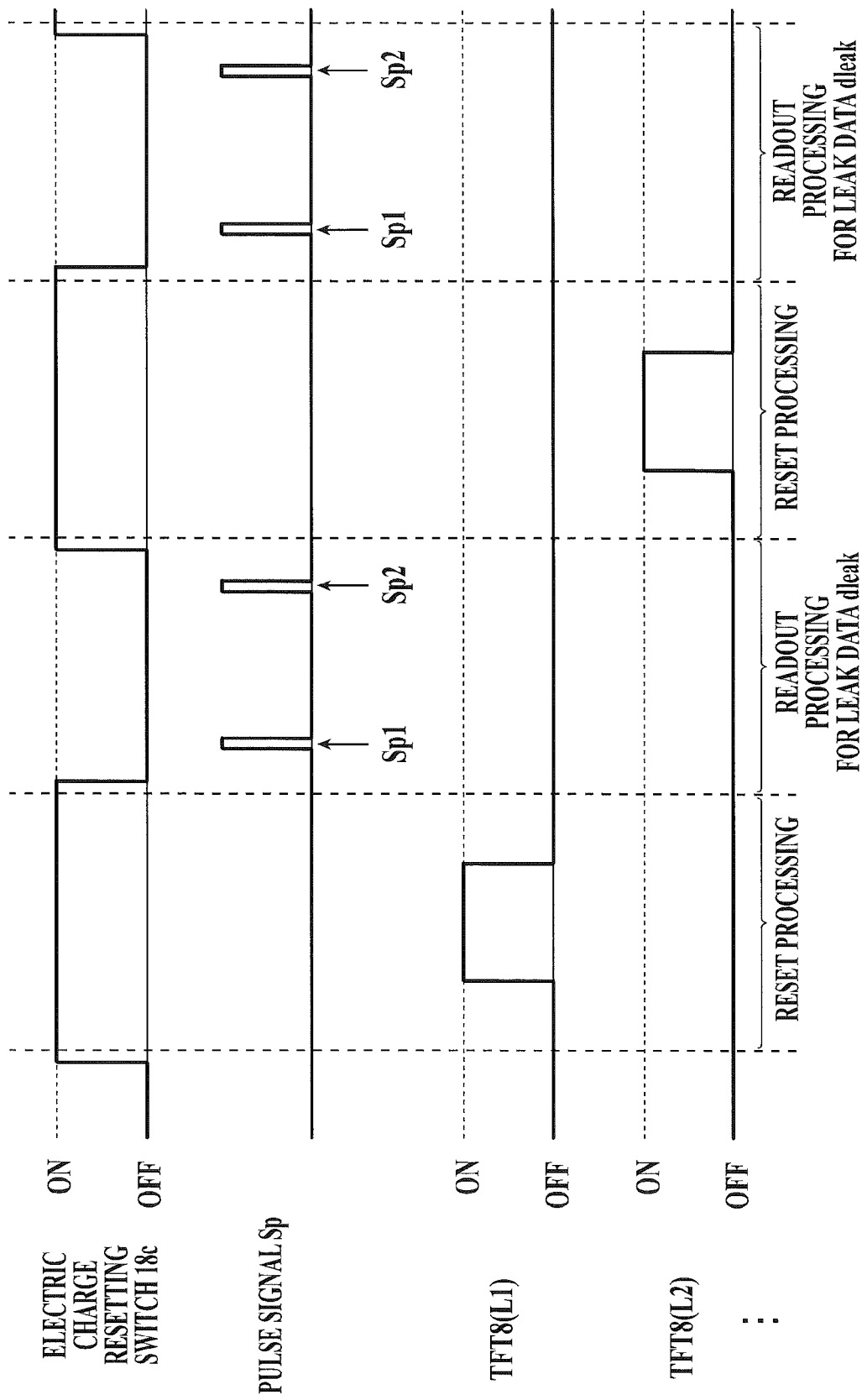
FIG. 11 is a timing chart showing ON/OFF timing of the electric charge resetting switch, the pulse signal and the TFTs in the case of adopting a configuration so as to alternately carry out the readout processing for the leaked data and the reset processing for the respective radiation detection elements before radiation image capturing.
Figure 12:
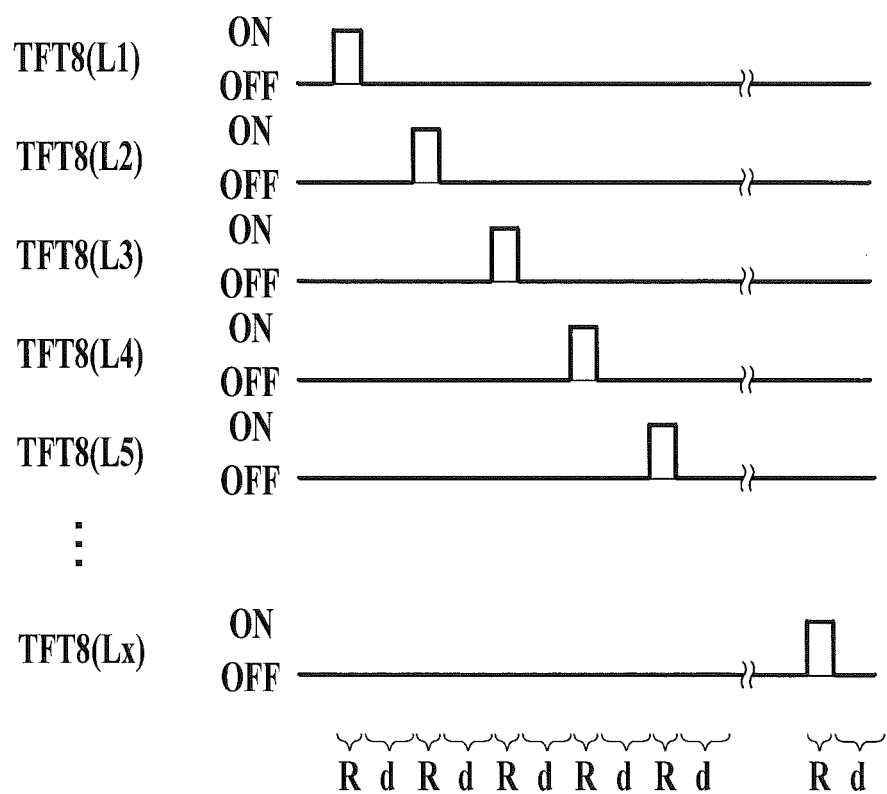
FIG. 12 is a timing chart showing timing of sequentially applying an ON voltage to the respective TFTs in the case of adopting the configuration so as to alternately carry out the readout processing for the leaked data and the reset processing for the respective radiation detection elements before the radiation image capturing.

Therefore, in the case of adopting Detection Method 1, that is, in the case of adopting the configuration so as to repeatedly perform the readout processing for the leaked data dleak before the radiation image capturing, a configuration is usually adopted so as to perform reset processing for the radiation detection elements 7 between the readout processing for the leaked data dleak and the next readout processing for the leaked data dleak. That is to say, in Detection Method 1, as shown in FIG. 11 and FIG. 12, a configuration is usually adopted so that the readout processing for the leaked data dleak and the reset processing for the respective radiation detection elements 7 can be alternately performed.

Note that, in FIG. 12 and FIG. 15 to be described later, reference symbol "R" denotes that the reset processing for the respective radiation detection elements 7 is performed, and reference symbol "L" denotes that the readout processing for the leaked data dleak is performed.

[Detection Method 2]

Detection Method 2 is a detection method described in the above-mentioned Pamphlet of International Publication No. WO2011/152093. For details of this Detection Method 2, refer to this literature.

Figure 13:
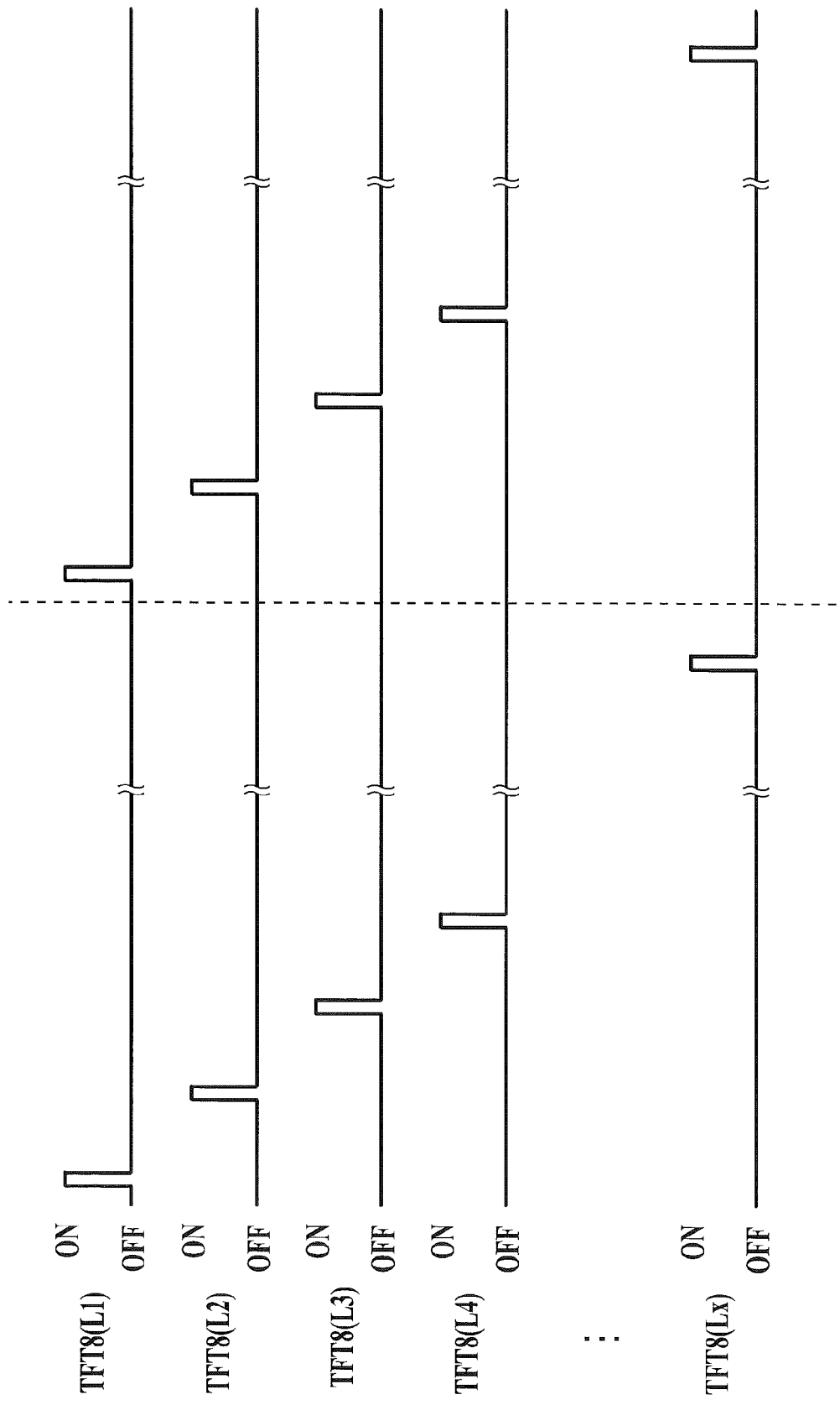
FIG. 13 is a timing chart showing timing of sequentially applying the ON voltage to the respective scanning lines when the readout processing for the image data is repeatedly carried out before the radiation image capturing in Detection Method 2.

In this Detection Method 2, before the radiation image capturing, the control unit 22 of the radiation image capturing apparatus 1 controls the respective readout circuits 17 and the like in a similar way to the case of the readout processing for the image data D, which is shown in FIG. 5, then as shown in FIG. 13, sequentially applies the ON voltage to the respective lines L1 to Lx of the scanning lines 5 from the gate driver 15b of the scan drive unit 15, and repeatedly performs readout processing for image data for the above-mentioned detection of the irradiation start (hereinafter, this data is represented as image data d for such irradiation start detection for the purpose of being discriminated from the image data D as a main image) from the respective radiation detection elements 7.

Then, when the radiation is irradiated onto the radiation image capturing apparatus 1, the electric charges are newly generated in the respective radiation detection elements 7.

Accordingly, in a similar way to the case of the leaked data dleak shown in FIG. 10, a value of the image data d for the irradiation start detection, which is to be read out, becomes larger than values of the image data d for the irradiation start detection, which are read out previously. As described above, in Detection Method 2, the value of the image data d for the irradiation start detection, which is to be read out, is changed by the fact that the radiation is irradiated.

Accordingly, though not shown, by using this, it is possible to adopt a configuration so as to preset a threshold value dth for the image data d for the irradiation start detection and to detect the start of the radiation irradiation onto the radiation image capturing apparatus 1 at the point of time when the read image data d for the irradiation start detection exceeds the threshold value dth.

[Detection Method 3]

Moreover, besides the above-described Detection Methods 1 and 2, for example, such a configuration as described in U.S. Pat. No. 7,211,803 and Japanese Patent Application Laid-Open Publication No. 2009-219538, which are mentioned above, is also adoptable. For example, when the radiation irradiation onto the radiation image capturing apparatus 1 is started and the electric charges are generated in the respective radiation detection elements 7 (refer to FIG. 3 and the like), the electric charges flow out from the respective radiation detection elements 7 to the bias lines 9 connected to the respective radiation detection elements 7, and the current I flowing through the bias lines 9 is increased. By using this phenomenon, it is also possible to adopt a configuration so as to detect the start of the radiation irradiation. For details of this Detection Method 3, refer to the above-described respective literatures.

Figure 14:
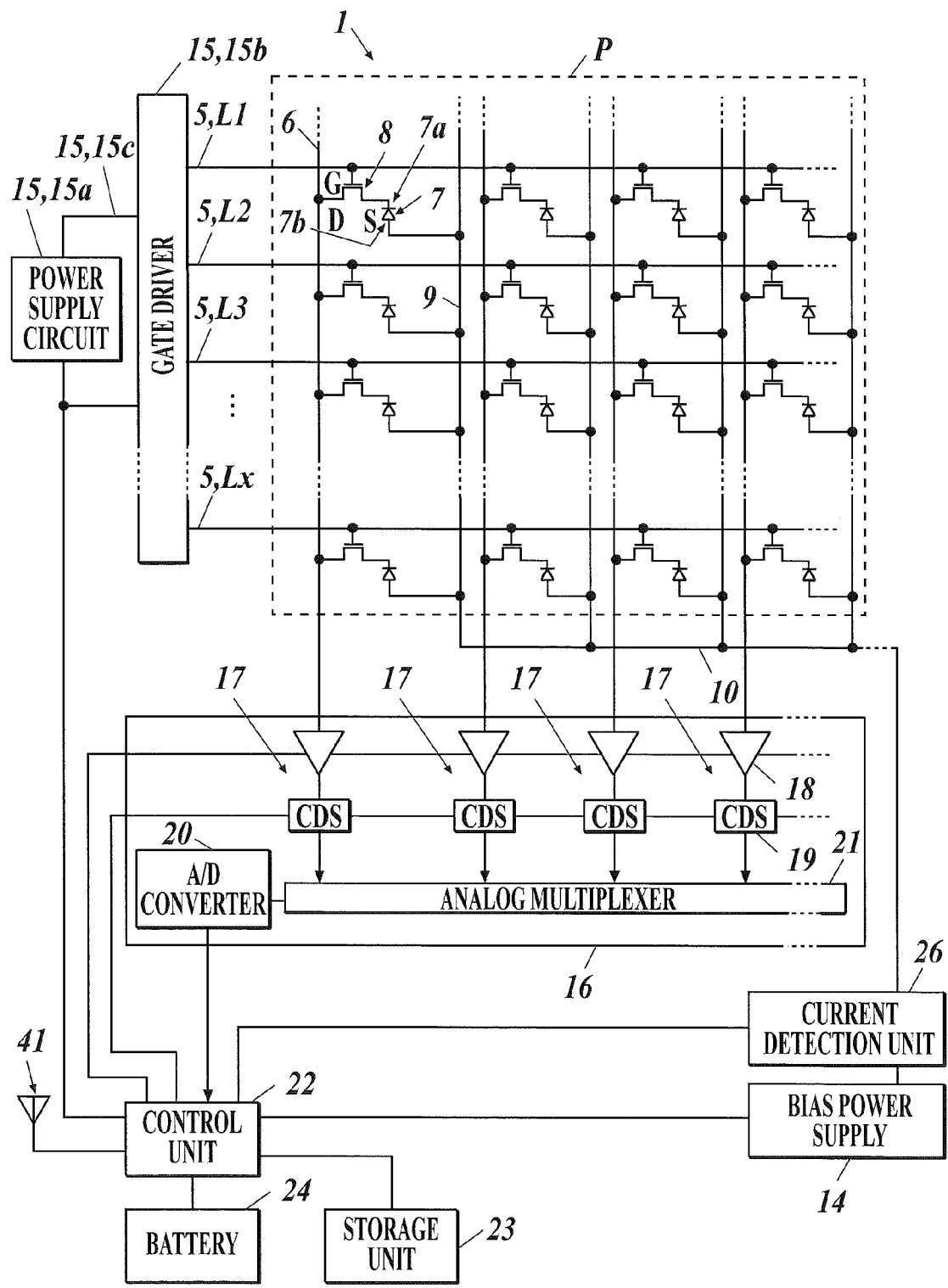
FIG. 14 is a block diagram showing an equivalent circuit of the radiation image capturing apparatus in a case where a current detection unit is provided in Detection Method 3.

Specifically, for example as shown in FIG. 14, a configuration is adopted so as to provide a current detection unit 26 on the bias lines 9 and the connection line 10, and to detect a value of the current I flowing through the bias lines 9 and the connection line 10 by the current detection unit 26, and then to output the detected value of the current I to the control unit 22.

In the case of adopting the configuration as described above, when the radiation is irradiated onto the radiation image capturing apparatus 1, the value of the current I flowing through the bias lines 9 and the connection line 10 in such a manner as described above becomes larger than values of the current I, which are detected previously. As described above, in Detection Method 3, the value of the current I flowing through the bias lines 9 and the connection line 10 is changed by the fact that the radiation is irradiated.

Accordingly, though not shown, by using this, it is possible to adopt a configuration so as to preset a threshold value Ith for the values of the current I flowing through the bias lines 9 and the connection line 10, that is, the values of the current I, which are to be detected by the current detection unit 26, and so as to detect the start of the radiation irradiation onto the radiation image capturing apparatus 1 at the point of time when the detected values of the current I exceed the threshold value Ith.

As described above, in the radiation image capturing apparatus 1, for example, the above-described Detection Methods 1 to 3 and the like are adopted, whereby it becomes possible to adopt the configuration so that the radiation irradiation from the radiation source of the radiation generation device can be detected by the radiation image capturing apparatus 1 itself.

Note that, as described in Pamphlet of International Publication No. WO2011/135917 and Pamphlet of International Publication No. WO2011/152093), it is also possible to further improve the above-described Detection Methods 1 and 2, Detection Method 3 and the like, and to adopt a configuration so as to allow the radiation image capturing apparatus 1 itself to accurately detect that the radiation irradiation is started.

[Regarding Processing After Detection of Start of Radiation Irradiation]

Moreover, upon detecting that the radiation irradiation is started in such a manner as described above, then for example as shown in FIG. 15 of the case of adopting Detection Method 1, the control unit 22 of the radiation image capturing apparatus 1 applies the OFF voltage from the gate driver 15b to all the lines L1 to Lx of the scanning lines 5, turns the respective TFTs 8 to the OFF state, and shifts the respective radiation detection elements 7 to an electric charge accumulation state where the electric charges generated in the respective radiation detection elements 7 by the irradiation of the radiation are accumulated in the respective radiation detection elements 7.

Then, for example, after continuing the electric charge accumulation state for a predetermined time after the start of the radiation irradiation is detected, the control unit 22 performs the readout processing for the image data D as the main image.

Figure 15:
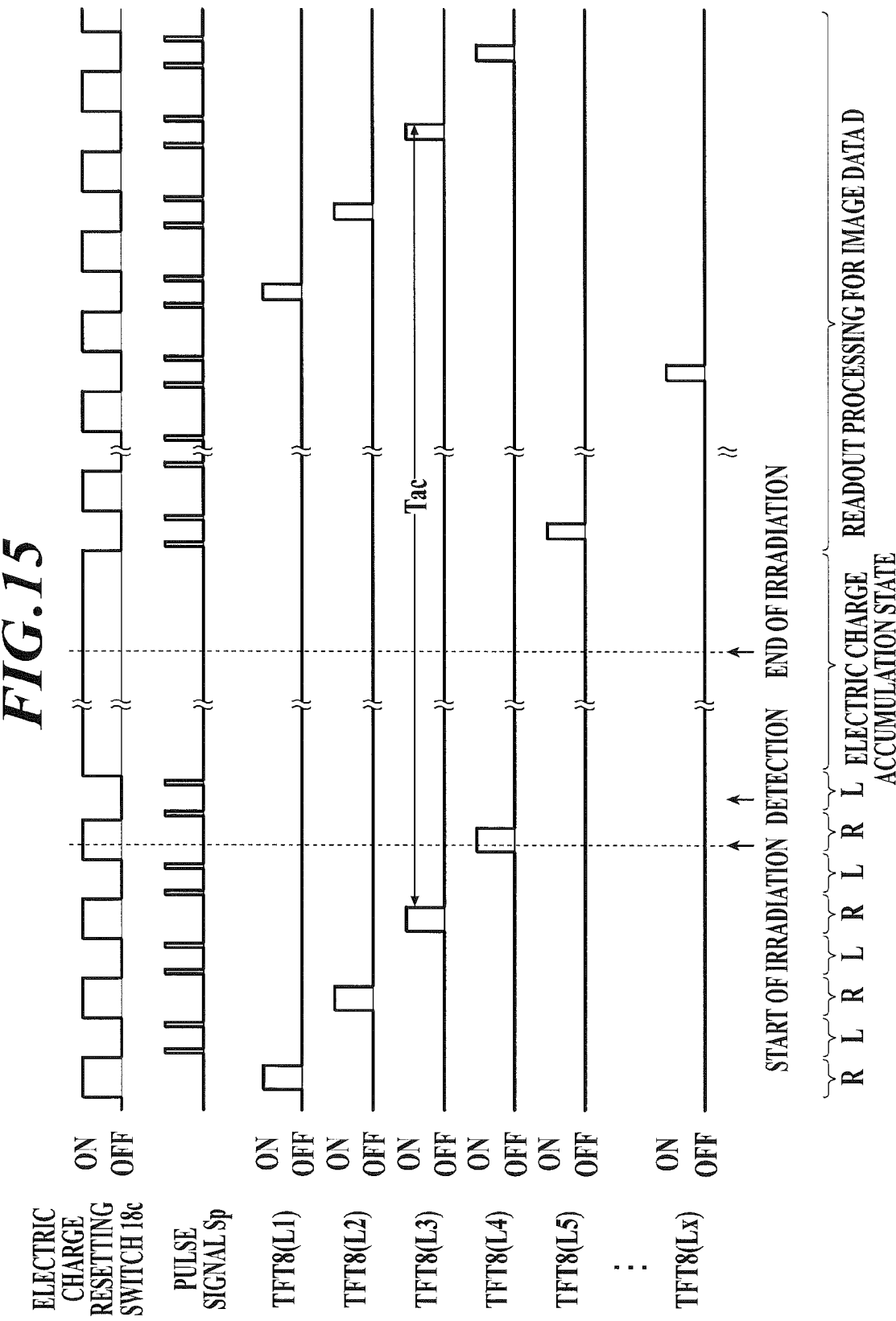

In that event, in this embodiment, as shown in FIG. 15, the control unit 22 starts the application of the ON voltage from the scanning line 5 (the line L5 of the scanning line 5 in the case of FIG. 15) to be applied with the ON voltage next to the scanning line 5 (the line L4 of the scanning line 5 in the case of FIG. 15) applied with the ON voltage at the point of time when the start of radiation irradiation is detected or immediately before the point of time, sequentially applies the ON voltage to each scanning line 5 from the gate driver 15b and performs the readout processing for the image data D.

Note that, in the following, the scanning line 5 (the line L4 of the scanning line 5 in the case of FIG. 15) applied with the ON voltage at the point of time when the start of the radiation irradiation is detected or immediately before the point of time is represented as a detection line Ld, and the scanning line 5 (the line L5 of the scanning line 5 in the case of FIG. 15) to be applied with the ON voltage after the detection line Ld and subjected to the start of the readout processing for the image data D as mentioned above is represented as a readout starting line Ls.

Moreover, in the case of adopting the above-described Detection Method 1, the detection line Ld is the scanning line 5 applied with the ON voltage in the reset processing for the respective radiation detection elements 7 immediately before the readout processing for the leaked data dleak from which the start of the radiation irradiation is detected. In the case of adopting the above-described Detection Method 2, the detection line Ld is the scanning line 5 applied with the ON voltage in the readout processing for the image data d for the irradiation start detection, from which the start of the radiation irradiation is detected.

Moreover, in the case of adopting the above-described Detection Method 3, usually, a configuration is adopted so that the ON voltage can be sequentially applied from the gate driver 15b to the respective lines L1 to Lx of the scanning lines 5 simultaneously with the detection processing for the value of the current I in the current detection unit 26, and that the reset processing for the respective detection elements 7 can be thereby performed. Therefore, the detection line Ld is the scanning line 5 applied with the ON voltage in the reset processing for the respective radiation detection elements 7 at the point of time when the start of the radiation irradiation is detected or immediately before the point of time.

Note that, in the case of adopting the configuration as shown in FIG. 15, a time Tac in FIG. 15 is a time of leaving each of the TFTs 8 in the OFF state before performing the readout processing for the image data D, and this time Tac is the above-mentioned effective accumulation time Tac.

Meanwhile, after ending the readout processing for the image data D as the main image in such a manner as described above, the control unit 22 of the radiation image capturing apparatus 1 subsequently performs readout processing for the offset data O. Note that it is also possible to adopt a configuration so as to perform the readout processing for the offset data O before the radiation image capturing.

Then, in this embodiment, though not shown, in the readout processing for the offset data O, the control unit 22 performs the reset processing for the respective radiation detection elements 7 a predetermined number of times, and thereafter, repeats the same processing sequence as s processing sequence shown in FIG. 15, which is up to the readout processing for the image data D as the main image, and performs the readout processing for the offset data O.

That is to say, after the end of the readout processing for the image data D, in the case of Detection Method 1, the readout processing for the leaked data dleak and the reset processing for the respective radiation detection elements 7 are performed, and in the case of Detection Method 2, the readout processing for the image data d for the irradiation start detection is performed the predetermined number of times, thereafter, the state is shifted to the electric charge accumulation state, and thereafter, the readout processing for the offset data O is performed.

When the configuration is adopted as described above, there is an advantage that the effective accumulation time Tac (refer to FIG. 15) before the readout processing for the image data D and an effective accumulation time before the readout processing for the offset data O become the same time for each of the scanning lines 5.

Note that the radiation is not irradiated in the event of the readout processing for the offset data O. Therefore, after the readout processing for the image data D as the main image, which is as described above, it is also possible to adopt the configuration so as to perform only the reset processing for the respective radiation detection elements 7 without performing the readout processing for the leaked data dleak, and to perform the reset processing for the respective radiation detection elements 7 in place of the readout processing for the image data d for the irradiation start detection.

[Regarding Procedure of Radiation Image Capturing, and the Like]

Next, a description is made of a procedure of the radiation image capturing in the radiation image capturing system 50 and the radiation image capturing apparatus 1 according to this embodiment, and the transmission timing of the data from the radiation image capturing apparatus 1 to the console 58. Moreover, a description is also made of functions of the radiation image capturing system 50 and the like according to this embodiment in combination.

Figure 16:
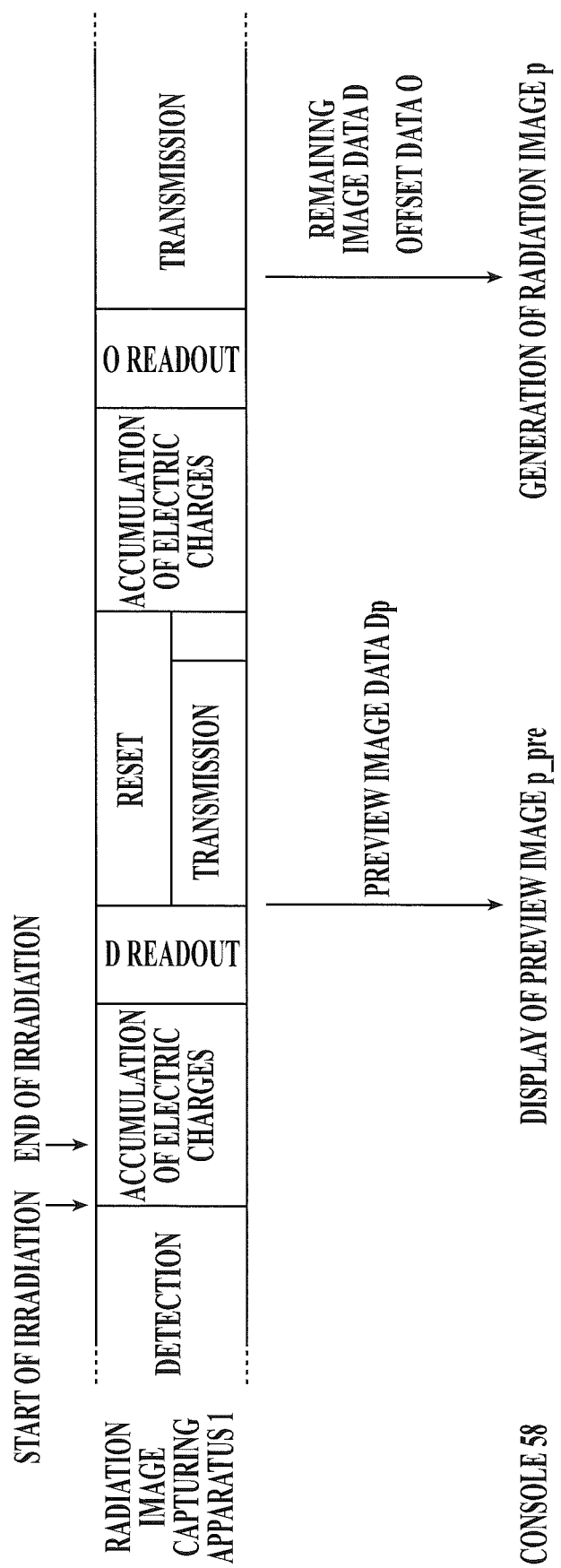
FIG. 16 is a view showing a procedure and the like of the radiation image capturing.

In this embodiment, as shown in FIG. 16, the control unit 22 of the radiation image capturing apparatus 1 performs the detection processing for the start of the radiation irradiation by using the above-described Detection Methods 1 to 3 and the like. Then, as mentioned above, when the start of the radiation irradiation is detected, the control unit 22 shifts the state to the electric charge accumulation state, and allows the respective radiation detection elements 7 to accumulate therein the useful electric charges generated in the respective radiation detection elements 7 by the radiation irradiation.

Then, after the end of the radiation irradiation, the control unit 22 performs the readout processing for the image data D as the main image. In that event, in this embodiment, as shown in FIG. 15, the control unit 22 is configured to start the application of the ON voltage from a readout starting line Ls (the line L5 of the scanning line 5 in the case of FIG. 15) as the scanning line 5 to be applied with the ON voltage next to a detection line Ld (the line L4 of the scanning line 5 in the case of FIG. 15) applied with the ON voltage at the point of time when the start of radiation irradiation is detected or immediately before the point of time, and to sequentially read out the image data D.

Then, in this embodiment, when the readout processing for the image data D as the main image is ended as described above, then as shown in FIG. 16, the control unit 22 is configured to perform the reset processing for the respective radiation detection elements 7 for the preparation of readout processing (refer to "readout of O" in FIG. 16) for the offset data O, and at the same time, to extract preview image data Dp from the readout image data D and transmit the extracted preview image data Dp to the console 58. Specifically, at the time of reading out the image data D, the control unit 22 extracts the preview image data Dp in a predetermined ratio from the readout image data D.

In that event, for example as shown in FIG. 17, if image data D, which is read out from a radiation detection element 7($n, m$) at an n-th row and an m-th column on the detection unit P of the radiation image capturing apparatus 1 is represented as D(n, m), then from among the readout image data D(n, m), the control unit 22 is configured to extract, as the preview image data Dp, the image data D(n, m), which is read out from the respective radiation detection elements 7 connected to the scanning lines 5 designated in advance in a ratio of one to a predetermined number (four in the case of FIG. 26) of the scanning lines 5, for example, as shown by being hatched with diagonal lines in FIG. 17, and then to transmit the extracted image data D(n, m) to the console 58.

Note that a selection method of the preview image data is not limited to this. Though not shown, for example, it is also possible to adopt such a configuration so as to thin at a predetermined ratio the main image data D from among the main image data D and to select the preview image data in such a manner that the image data D is selected, in a ratio of one, from among a predetermined number of pieces of image data D(n, m) readout from a predetermined number of radiation detection elements 7($n, m$), such as sixteen in total, which is composed of 4×4 pixels, that is, of four rows and four columns, and so on.

Figure 18:
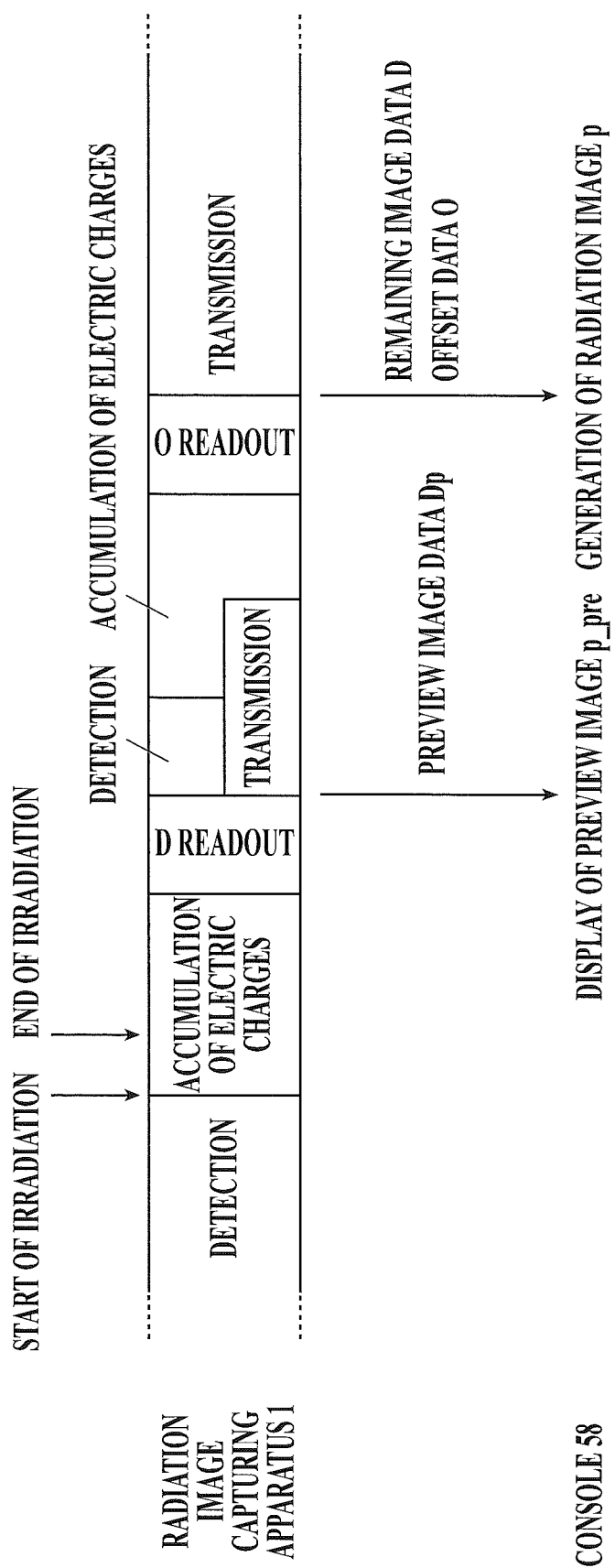
FIG. 18 is a view showing another configuration example of the procedure and the like of the radiation image capturing.

Moreover, as shown in FIG. 16, it is possible to adopt a configuration so as to shift to the electric charge accumulation state for the preparation of the readout processing for the offset data O after the transmission of the preview image data Dp is ended. However, in the case where such transmission processing for the preview image data Dp does not adversely affect the electric charge accumulation state, then for example as shown in FIG. 18, it is also possible to adopt a configuration so as to shift to the electric charge accumulation state during the transmission processing for the preview image data Dp, and in terms of this point, a configuration is appropriately adopted.

Moreover, it is also possible to adopt a configuration so as to transmit the preview image data Dp to the console 58 after the readout processing for the offset data O is ended, and the present invention is applicable even to such a case.

[Regarding Display of Preview Image on Console and Conventional Problem Thereof]

In this embodiment, upon receiving the preview image data Dp transmitted from the radiation image capturing apparatus 1 as described above, the console 58 (refer to FIG. 6 and FIG.

7) displays the preview image data p_pre on the display unit 58a based on the transmitted preview image data Dp.

In generation processing for the preview image p_pre and the radiation image p, it is originally desirable that the respective images be generated based on true image data D* calculated by subtracting the offset data O, which is read out before and after the image data D is read out, from the image data D in accordance with the following Expression (1):

$$D^* = D - O \quad (1)$$

The reason for the above is as follows. That is to say, the offset data O is read out before and after the image data D is read out, whereby it becomes possible to read out the offset data O under substantially the same situation as a situation where the image data D is read out, and the offset amount, which results from the dark electric charges superimposed on the image data D, and the offset data O become substantially the same value for each of the radiation detection elements 7.

Therefore, the offset data O is subtracted from the image data D, whereby the offset amount, which results from the dark electric charges superimposed on the image data D, and the offset data O are accurately cancelled with each other, and it becomes possible to set the true image data D*, which is to be calculated, to a value that does not depend on the dark electric charges and the like but results only from the useful electric charges generated in the radiation detection elements 7 by the radiation irradiation.

However, as shown in FIG. 16 and FIG. 18, the readout processing for the offset data O is not performed yet at the point of time when the preview image data Dp is transmitted to the console 58, and the offset data O cannot be transmitted to the console 58.

Moreover, if the configuration is adopted so as to first transmit the preview image data Dp, and to thereafter perform the processing for subtracting the offset data O from the preview image data Dp at the point of time of receiving the offset data O, then the display of the preview image p_pre on the console 58 must be awaited until the readout processing for the offset data O is ended.

However, with this configuration, it becomes difficult to satisfy the request from the operator such as the radiographer, which tells that the preview image p_pre should be displayed earlier on the display unit 58a of the console 58, and that the determination as to whether or not the re-capturing is necessary should be thereby performed earlier.

Accordingly, in the conventional radiation image capturing system, a configuration has been adopted so that the console 58 can hold tentative offset data for the preview image in advance, and that this tentative offset data for the preview image can be subtracted from the received preview image data Dp. Moreover, in some cases, a configuration has been adopted so that, in place of using the tentative offset data for the preview image, offset data O obtained in the event of the last radiation image capturing can be subtracted from the preview image data Dp obtained in the capturing performed this time.

However, if the configuration is adopted as described above, then it is as mentioned above that, for example as shown in FIG. 23, such a problem can occur that a brightness difference appears at the portion in the generated and displayed preview image p_pre, in the portion corresponding to the readout starting line Ls.

[Regarding Cause of Occurrence of Brightness Difference]

The inventors of the present invention made researches for the cause that the brightness difference as described above appears, and found out the following as a result.

Figure 23:
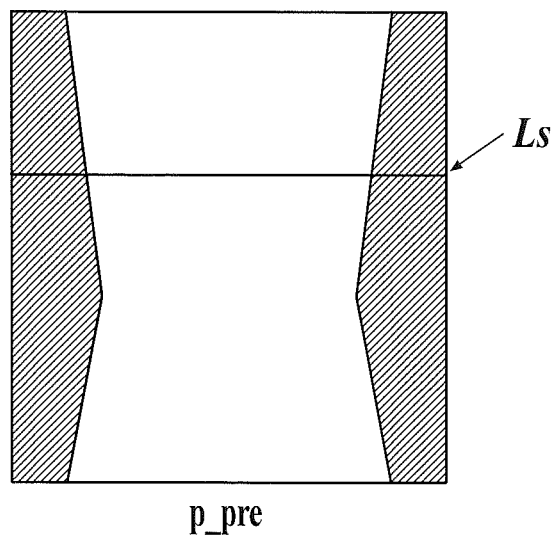
FIG. 23 is a view showing a brightness difference that appears in the preview image.

FIG. 23 shows the case of the preview image p_pre in the case where a patient's abdomen is captured as the subject; however, in the researches of the inventors of the present invention, the brightness difference appears on the portion corresponding to the readout starting line Ls even in a state where the subject is not captured. Moreover, it is already found out that the brightness difference appears on the portion corresponding to the readout starting line Ls even in a state where the radiation is not irradiated onto the radiation image capturing apparatus 1.

That is to say, even in the state where the radiation is not irradiated onto the radiation image capturing apparatus 1, detection processing for the start of the radiation irradiation is performed as described above in the radiation image capturing apparatus 1. Then, it is determined that the start of the radiation irradiation is detected based on the leaked data dleak read out immediately after the ON voltage is applied to an arbitrary line L (corresponding to the above-described detection line Ld) of the scanning line 5, the state is shifted to the electric charge accumulation state, and the application of the ON voltage is started from the readout starting line Ls to be applied with the ON voltage next, whereby the readout processing for the image data D is performed.

Figure 19:
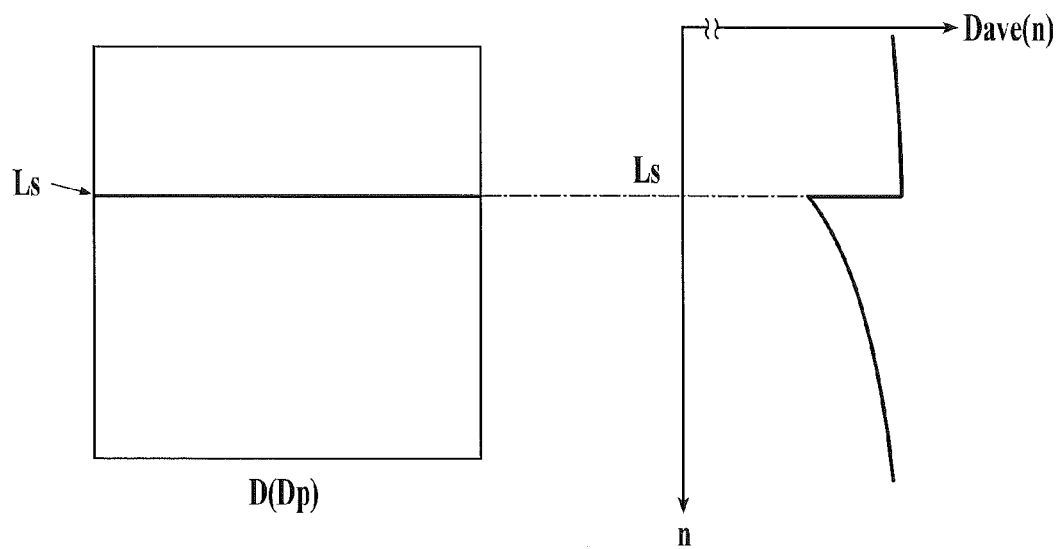
FIG. 19 is a view showing a brightness difference that appears on a portion of a readout starting line of the image data or the preview image data, and is a graph showing an average value of the image data for each of the scanning lines.

In this case, what is to be read out is the image data D corresponding to the offset amount resulting from the dark electric charges and the like. However, the following is found out. As shown in FIG. 19, also in the image data D as described above, the brightness difference occurs on the portion of the readout starting line Ls, and in the preview image data Dp to be extracted, the brightness difference occurs in the portion of the readout starting line Ls.

For the purpose of specifying the cause that the brightness difference as described above occurs, for example, in the respective image data D shown in FIG. 19, the image data D arrayed in a horizontal direction (corresponding to an extended direction of the scanning lines 5 in the radiation image capturing apparatus 1) in FIG. 19 are added together to calculate average values Dave(n). Reference symbol n in this case corresponds to the line number of each scanning line 5.

Then, the following is found out. When the calculated average values Dave(n) of the image data D are arrayed and plotted for each of the line numbers n of the scanning lines 5, the brightness difference occurs in the portion of the readout starting line Ls in the average values Dave (n) of the image data D as in a graph shown on a right side of FIG. 19. A cause that the brightness difference as described above appears is conceived as follows at the present time.

Figure 20A:
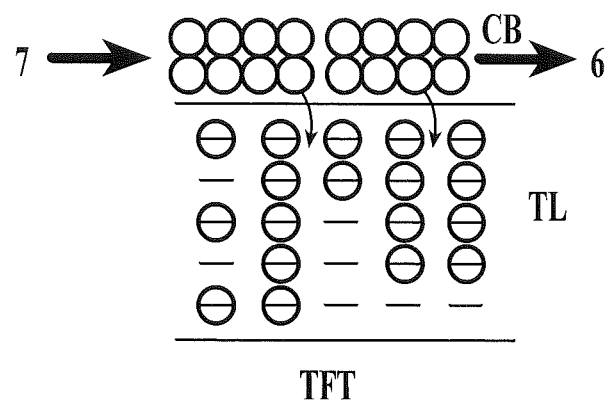
FIG. 20A is a view showing a state where a part of electric charges which pass through a conduction band is trapped to a trap level.

That is to say, before the shift to the electric charge accumulation state (refer to FIG. 15), in a state where the reset processing (refer to FIG. 12 and the like) for the respective radiation detection elements 7, the readout processing (refer to FIG. 13) for the image data d for the detection of the irradiation start, and the like are repeatedly performed, the electric charges (refer to hollow circles in FIG. 20A), which flow out from the radiation detection element 7 to the signal line 6 every time when the TFT 8 is turned to the ON state, pass through a conduction band CB in the TFT 8, in which a level is high in terms of energy, as shown in FIG. 20A.

Figure 20B:
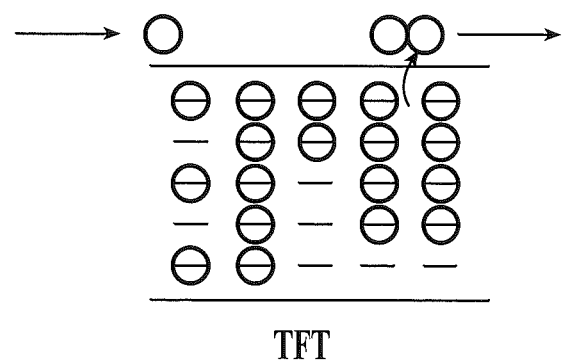
FIG. 20B is a view showing a state where a part of the trapped electric charges is leaked.

In that event, a part of the passing electric charges is trapped to a trap level TL existing in a band gap lower than this conduction band CB in terms of energy, and remains in the TFT 8. Then, as shown in FIG. 20B, a part of the electric charges trapped to the trap level TL is leaked as a part of the leaked electric charges q (refer to FIG. 8) to the signal line 6 while the TFT 8 is being turned to the OFF state.

However, the electric charges are supplied to the trap level TL of the TFT 8 every time when the TFT 8 is turned to the ON state in the reset processing for each radiation detection element 7, and the like, and accordingly, under such a situation as described above where the reset processing for each radiation detection element 7 and the readout processing for the image data d for the irradiation start detection are repeatedly performed, a state is brought, where a state where relatively large electric charges are accumulated to the trap level TL of the TFT 8 is maintained.

Meanwhile, when the start of the radiation irradiation is detected and the state shifts to the electric charge accumulation state (refer to FIG. 15), the electric charges trapped to the trap level TL of the TFT 8 are leaked to the signal line 6; however, the reset processing for each radiation detection element 7, or the like comes not to be performed, and the electric charges to be supplied to the trap level TL become only electric charges with a small electric charge amount, which are to be leaked from the radiation detection element 7.

Figure 20C:
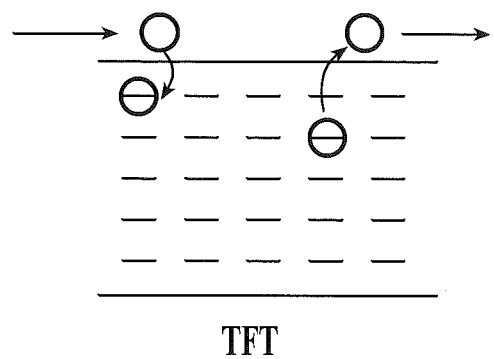
FIG. 20C is a view showing a state where the electric charges trapped to the trap level are reduced extremely at the time when the readout of the image data is started.

Therefore, as shown in FIG. 20C, an amount of the electric charges accumulated in the trap level TL of each TFT 8 turns to an extremely small state at the time when the electric charge accumulation state is ended, that is, at the time when the readout for the image data D is started.

Actually, as surmised from the state shown in FIG. 8, the image data D to be read out in the readout processing for the image data D is data corresponding to a total value of: a large amount of electric charges Q which flow out to the signal line 6 through the ON-state TFT 8 from the radiation detection element 7 as a target from which the image data D is to be read out; and the electric charges q to be leaked through the OFF-state TFTs 8 from the other respective radiation detection elements 7 connected to the same signal line 6.

Then, at the time when the readout processing for the image data D is started, as described above, the amount of the electric charges accumulated in the trap level TL of the TFT 8 is extremely small, that is, in a situation like drying up, and accordingly, the present state is where the amount of the above-described electric charges q to be leaked from the other radiation detection elements 7 through the OFF-state TFTs 8 is small.

Therefore, even if the same amount of the electric charges Q flow out to the signal line 6 through the ON-state TFT 8 from the radiation detection element 7 as the target from which the image data D is to be read out, the amount of the electric charges q to be leaked through the TFTs 8 from the other respective radiation detection elements 7, the electric charges q being to be superimposed on the electric charges Q, is small. Accordingly, as a result, the value of the image data D to be read out becomes small at the portion of the readout starting line Ls as shown in FIG. 19.

Then, when the TFT 8 is turned to the ON state, and the image data D is read out, then as shown in FIG. 20B, a part of the electric charges passing through the conduction band CB of the TFT 8 concerned is trapped to the trap level TL, and the amount of the electric charges trapped to the trap level TL is increased. Therefore, in the TFT 8 as described above, the amount of the electric charges q to be thereafter leaked is increased.

As described above, in the readout processing for the image data D, every time when the ON voltage is sequentially applied from the gate driver 15b to the scanning lines 5, the TFTs 8 are turned to the ON state, and the electric charges Q are discharged to the signal lines 6, the amount of the electric charges trapped to the trap level TL of each of the TFTs 8 concerned is increased, and the amount of the electric charges q to be thereafter leaked is increased.

Therefore, as shown in FIG. 19, every time when the readout processing for the image data D is ended for each of the scanning lines 5, the number of the TFTs 8, in which the amount of the electric charges q to be leaked is increased, is increased, and accordingly, the value of the image data D to be read out is increased as the readout processing for the image data D is running.

Then, in this embodiment, the application of the ON voltage is started from the readout starting line Ls (for example, the line L5 of the scanning line 5 in FIG. 15), the ON voltage is applied up to a final line Lx of the scanning line 5, and further, the image data D is read out from the first line L1 of the scanning line 5 to the detection line Ld (for example, the line L4 of the scanning line 5 in FIG. 15), and at that time, the value of the image data D to be read out becomes sufficiently large.

Therefore, it is conceived that the brightness difference as shown in FIG. 19 occurs between the small-value image data D on the readout starting line Ls (for example, the line L5 of the scanning line 5 in FIG. 15) and the sufficiently large-value image data D on the detection line Ld (for example, the line L4 of the scanning line 5 in FIG. 15).

That is to say, the reason why the image data D, of which value has been small at the portion of the readout starting line Ls, gradually becomes large as the readout processing is running is conceived to be as follows. That is, the reason is not because the electric charges to be read out from the radiation detection element 7 concerned that is reading out the image data D are increased. Rather, it is because the electric charges q to be leaked from the other radiation detection elements 7 gradually become large, and accordingly an amount of contribution thereof increases.

Note that, in the readout image data D, amounts of contribution of the electric charges q to be leaked from the other radiation detection elements 7 are included as an offset amount other than the above-described true image data D* (note that, in this offset amount, the offset amount that results from the dark electric charges from the radiation detection element 7 concerned is also included as described above). Moreover, this amount of contribution is also included in the offset data O.

In the conventional radiation image capturing system, for example, the configuration has been adopted so that the tentative offset data for the preview image, which is set at the same value for each of the radiation detection elements 7 and does not include the brightness difference, can be subtracted from the preview image data Dp extracted from the image data D in which the brightness difference occurs on the portion of the readout starting line Ls as described above.

Therefore, the brightness difference is not resolved, and the brightness difference remains also in the true image data D* calculated in accordance with the above-described Expression (1). Then, the preview image p_pre is generated based on the true image data D* in which the brightness difference is left included, and it is therefore conceived that the brightness difference has appeared in the preview image p_pre as shown in FIG. 23.

Moreover, as mentioned above, in some cases, the configuration has also been adopted so that, in place of using the tentative offset data for the preview image, the offset data O obtained in the event of the previous radiation image capturing can be subtracted from the preview image data Dp obtained in the capturing performed this time.

However, if the configuration is adopted in such a manner, besides the brightness difference that is occurring in the preview image data Dp obtained in the capturing performed this time, the brightness difference has also occurred in the offset data O obtained in the event of the previous radiation image capturing. Then, the readout starting line Ls in the event of the last radiation image capturing usually becomes the scanning line 5 different from the readout starting line Ls in the event of the radiation image capturing at this time.

As a result, though not shown, a state where two brightness differences appear in the preview image p_pre has been brought up in the case of adopting such a configuration.

[Regarding Way of Image Correction for Resolving Brightness Difference, and the Like]

Accordingly, in this embodiment, the console 58 is configured so as, in such a manner as below, to perform image correction for the preview image data Dp, to eliminate the brightness difference from the preview image p_pre to be displayed on the display unit 58a, or to reduce the appearing brightness difference to turn the same to a state of being hardly visually recognizable, and then to display the preview image p_pre.

That is to say, the console 58 holds in advance a relationship between a number N of the scanning line 5 to be first applied with the ON voltage in the event where the radiation image capturing apparatus 1 starts the readout processing for the image data D, that is, of the scanning line 5 to be applied with the ON voltage in the readout processing in the case of setting the readout starting line Ls as a starting point, and an offset amount O(N) resulting from the dark electric charges superimposed on the readout image data D, and the like.

Then, in display processing for the preview image p_pre, the console 58 moves the starting point (that is, N=0) concerned to an actual position of the readout starting line Ls, and calculates an offset amount Od for each of the scanning lines 5 by applying the above-described relationship. Then, the console 58 is configured to generate and display the preview image p_pre based on a value (that is, the true image data D*) obtained by subtracting the offset amount Od from the corresponding preview image data Dp.

A description is made below of the above-described point in detail. Here, it is necessary to pay attention to the following points. In the graph shown in FIG. 19, a profile of the average values Dave (n) of the image data D is illustrated so as to form a smooth curved line; however, a profile of the average values Dave (n) of the image data D, which is actually obtained, turns to a state where a fixed pattern for each of the scanning lines 5 is superimposed thereon.

That is to say, with regard to the image data D to be read out in a state where the radiation is uniformly irradiated onto the radiation image capturing apparatus 1, or in a state where the radiation is not irradiated onto the radiation image capturing apparatus 1, usually, the image data D concerned does not take the same value among the respective radiation detection elements 7, but causes magnitude variations among the respective radiation detection elements 7. Each of these is the fixed pattern of the image data D for each of the radiation detection elements 7; however, the fixed pattern of each radiation detection element 7 is also reflected on the average values Dave(n) of these, and a fixed pattern for each of the scanning lines 5, which results from these, occurs.

Therefore, the profile of the average values Dave(n) of the image data D, which is actually obtained, usually becomes a profile that has irregularities of such fixed patterns among the scanning lines 5. Therefore, as described above, in the case of obtaining the relationship between the number N of the scanning line 5, which is to be applied with the ON voltage in the readout processing in the case of setting the readout starting line Ls as the starting point, and the offset amount O(N) resulting from the dark electric charges superimposed on the readout image data D, and the like, even if the profile of the average values Dave(n) of the image data D, which is actually obtained, is analyzed as it is, usually, the above-described relationship is not necessarily obtained appropriately.

Accordingly, in this embodiment, the readout processing for the image data D is performed at least twice while changing the readout starting line Ls. Note that the radiation may be irradiated onto the radiation image capturing apparatus 1 or not.

In that event, for example, between the two readout starting lines Ls, a readout starting line Ls1 for first readout processing is set, for example, to the first line L1 (refer to FIG. 3) of the scanning line 5, and a readout starting line Ls2 for second readout processing is set, for example, to a scanning line 5 located at a position as apart as possible from the first line L1 of the scanning line 5 on the detection unit P.

Figure 21A:
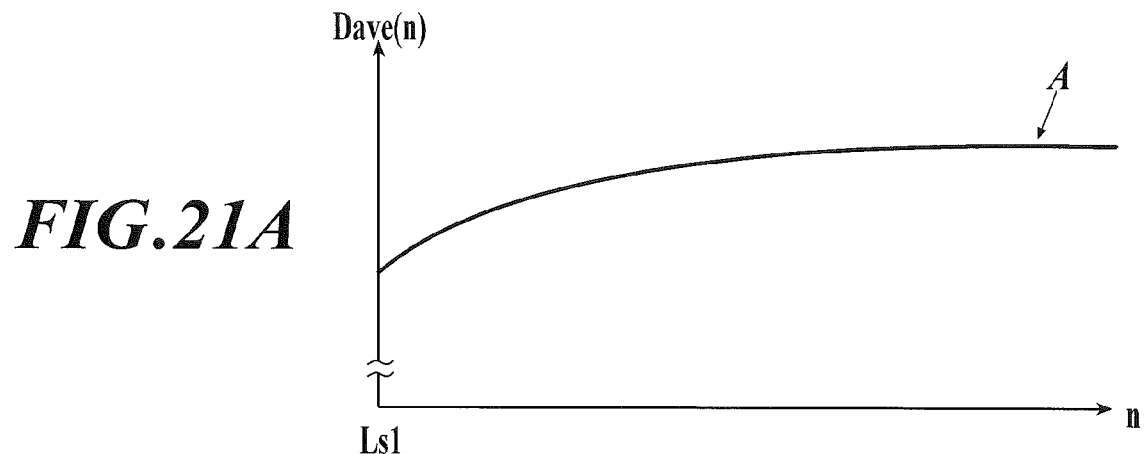
FIG. 21A is a graph showing a profile of an average value of the image data for each scanning line, which are read out for a first time.
Figure 21B:
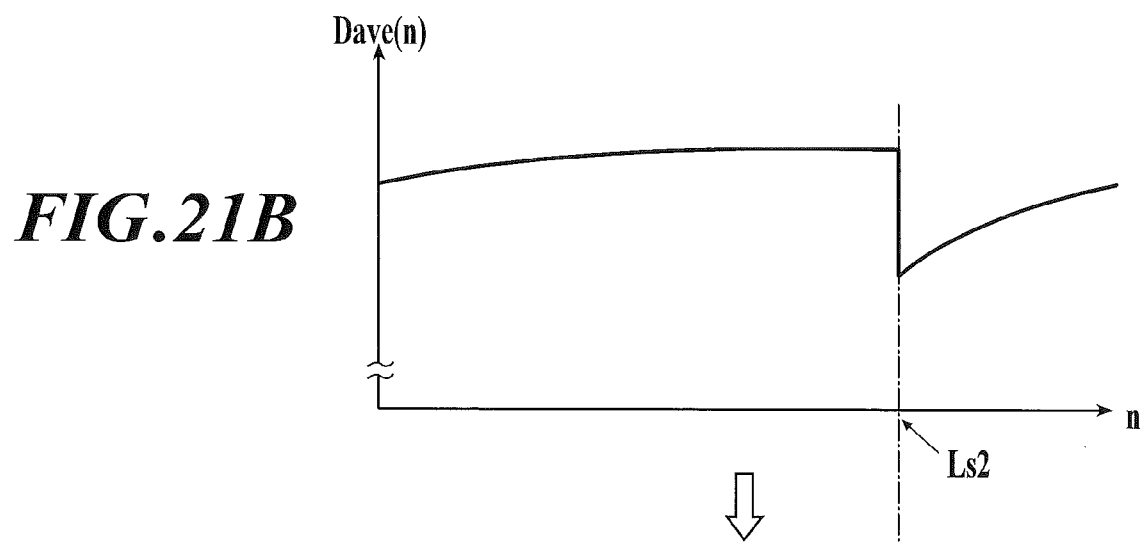
FIG. 21B is a graph showing a profile of an average value of the image data for each scanning line, which are read out for a second time.

Then, with regard to the image data D read out in the respective readout processing, when the average values Dave (n) for each of the scanning lines 5 are calculated, and are arrayed and plotted for each of the line numbers n of the scanning lines 5 in a similar way to the case shown in FIG. 19, then profiles as shown in FIG. 21A and FIG. 21B are formed. Note that, as mentioned above, the fixed pattern for each of the scanning lines 5 is superimposed on each of the profiles in this state.

Figure 21C:
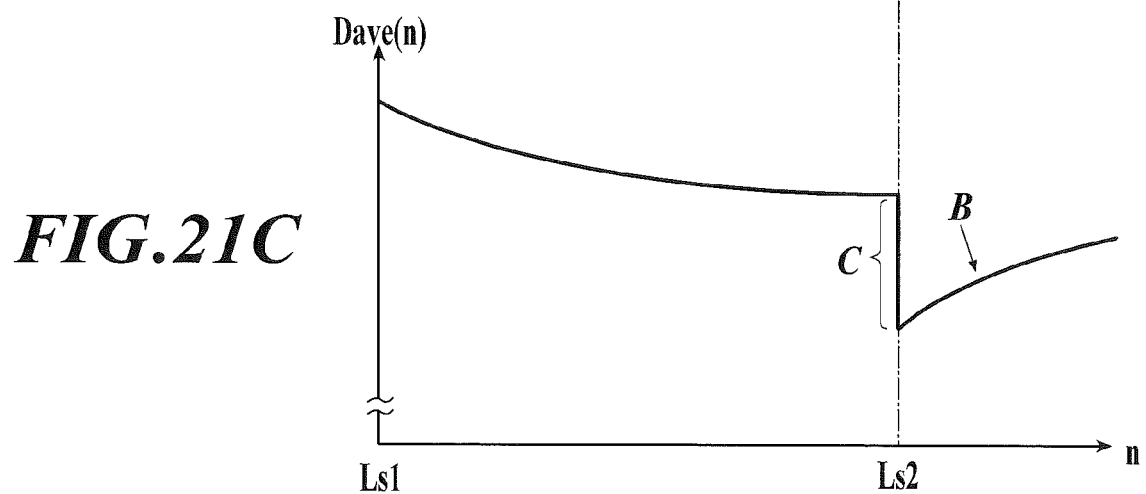
FIG. 21C is a graph showing a profile of a difference between both of the average values for each scanning line.

Then, regarding the two profiles, when differences ΔDave (n) between the average values Dave (n) of the line numbers n corresponding to each other are calculated and plotted, for example, a profile as shown in FIG. 21C is formed. Then, in the event of calculating the differences ΔDave(n), the fixed patterns for each of the scanning lines 5, which are superimposed on the respective profiles of FIGS. 21A and 21B, are cancelled with each other.

Therefore, the profile shown in FIG. 21C becomes a profile that does not include the fixed patterns for each of the scanning lines 5. Then, as described above, the profile becomes a profile that depends only on such a phenomenon that, from the state where the electric charge accumulation state is continued and the electric charges trapped to the trap level TL of each TFT 8 are decreased extremely, the readout processing for the image data D is started, the amount of the electric charges to be trapped to the trap level TL of each TFT 8 is gradually increased, the amount of the electric charges q to be leaked is gradually increased, and the image data D to be read out is gradually increased.

Then, in the radiation image capturing apparatus 1 according to this embodiment, as understood from the graph shapes of FIG. 21A and FIG. 21C, it is conceived that, in the case where the number of each of the scanning lines 5 is defined as N in the case where the number of readout starting line Ls serving as the starting point is tentatively defined as 0, the above-described relationship becomes a relationship that is gradually increased in a form of $a \times (1-b^{-N})$.

Accordingly, in this embodiment, in the case where reference symbols a, b and c are each defined to be constants, the above-described relationship, that is, the relationship between the number N of the scanning line 5, which is to be applied with the ON voltage in the readout processing, and the offset amount O(N), which results from the dark electric charges superimposed on the image data D to be read out, and the like, in the case where the read out starting line Ls is set to the starting point (N=0), is set in the following form:

$$O(N) = a \times (1-b^{-N}) + c \qquad (2)$$

Note that it is not necessarily necessary that the above-described relationship be set in the form of the above-described Expression (2), and may be set in a form of other functions such as a linear function.

Then, in this embodiment, the console 58 is configured to hold, in advance in the form of the above-described Expression (2), the relationship between the number N of the scanning line 5, which is to be applied with the ON voltage in the readout processing, and the offset amount O(N), which results from the dark electric charges superimposed on the image data D to be read out, and the like, in the case where the read out starting line Ls is set to the starting point.

The specific form of the above-described Expression (2), that is, the constants a to c are experimentally obtained in advance. The above-described relationship is the relationship between the number N of the scanning line 5 and the offset amount O(N) resulting from the dark electric charges and the like, and accordingly, an experiment is performed in the state where the radiation is not irradiated onto the radiation image capturing apparatus 1. In that event, the average values Dave (n) for each scanning line 5 (the line number is n) of the image data D of FIGS. 21A and 21B can also be read as average values of the offset amounts which result from the dark electric charges and the like from the respective radiation detection elements 7 connected to the scanning line 5 concerned.

Then, it is possible to obtain the constants a to c, for example, in such a manner as follows. That is to say, if it is regarded that a portion of reference symbol A in FIG. 21A has a constant value, then it can be regarded that at least the form of the above-described Expression (2) is reflected as it is on a portion B in the vicinity of the brightness difference in FIG. 21C. Accordingly, at least $a \times (-b^{-N})$ in the above-described Expression (2) can be calculated from a shape of the graph at the portion B in the vicinity of the brightness difference in FIG. 21C.

Moreover, the constant a in the above-described Expression (2) can be calculated from a difference C at the portion of the readout starting line Ls in FIG. 21C. Furthermore, it is also possible to obtain the constant c, for example, from FIG. 21A, and also possible to set the constant c at an appropriate value. In such a manner as described above, the constants a to c can be decided based on the graph of FIG. 21C calculated from the graphs of FIGS. 21A and 21B, and the like, and the form of the above-described Expression (2) can be determined.

Figure 22A:
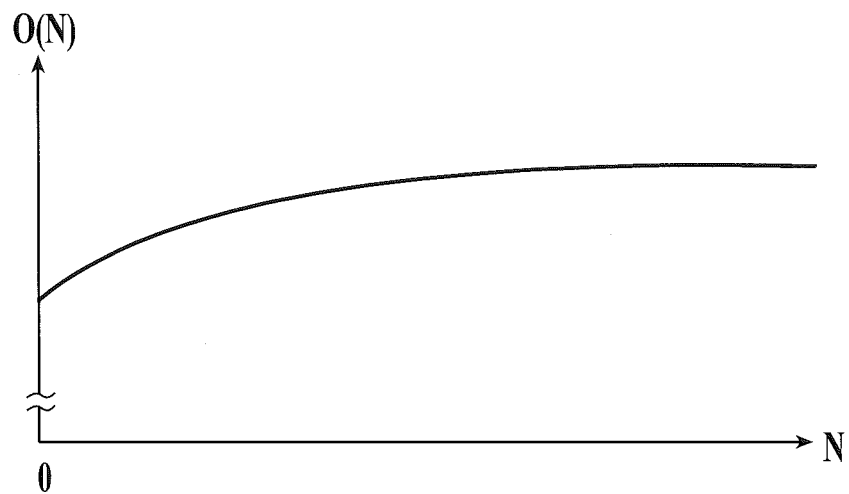
FIG. 22A is a graph showing an example of a relationship between a number N of the scanning line to which the ON voltage is to be applied and an offset amount O(N) resulting from dark electric charges superimposed on the image data to be read out, and the like, and FIG. 22B is a graph showing an example of a calculated offset amount Od for each scanning line.

Note that, when the above-described Expression (2) thus decided is illustrated, such a graph as shown in FIG. 22A is obtained, and this graph becomes a graph similar to that of FIG. 21A. However, as mentioned above, while a state where the fixed pattern for each of the scanning lines 5 is superimposed is brought in the graph shown in FIG. 21A, a state where such a fixed pattern for each of the scanning lines 5 is removed is brought in the graph shown in FIG. 22A.

Next, a description is made of a way of calculating the offset amount Od for each of the scanning lines 5 in the actual display processing for the preview image p_pre in the console 58. In this embodiment, the console 58 is configured so as to apply the above-described relationship of FIG. 22A, which is held in advance (or alternatively, the relationship may be expressed in a form of a table or the like, which corresponds thereto), and to thereby calculate the offset amount Od for each of the scanning lines 5 in the radiation image capturing concerned.

In this case, it becomes necessary to receive information regarding the readout starting line Ls from the radiation image capturing apparatus 1, that is, information regarding at least the line number n (hereinafter, the line number of the readout starting line Ls is represented as ns) of the scanning line 5 as the readout starting line Ls from the radiation image capturing apparatus 1.

Figure 22B:
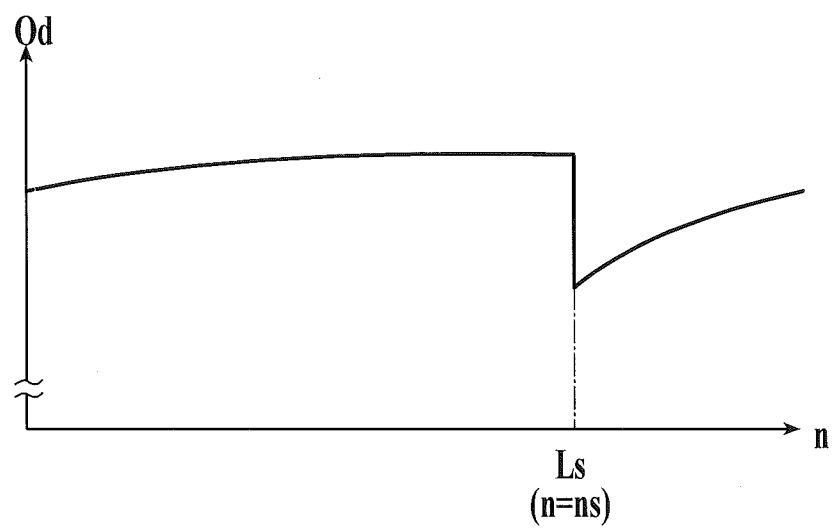

Then, as shown in FIG. 16 and FIG. 18, upon receiving the preview image data Dp and the information regarding the readout starting line Ls from the radiation image capturing apparatus 1, the console 58 modifies the shape of the relationship shown in FIG. 22A so as to move the starting point N=0 in the relationship concerned to the position of the line number ns of the received readout starting line Ls, and calculates the offset amount Od for each of the scanning lines 5, which is as shown in FIG. 22B, from the relationship shown in FIG. 22A.

Then, the console 58 subtracts the calculated offset amount Od from the received preview image data Dp for each of the scanning lines 5 corresponding thereto, and thereby calculates the true image data D* (refer to the above-described Expression (1)) regarding the preview image data Dp. Then, the console 58 is configured so as to implement simple image processing for the calculated true image data D*, and to display the preview image p_pre on the display unit 58a.

In the case where such a configuration is adopted, the offset amount Od (refer to FIG. 22B) for each of the scanning lines 5 in the radiation image capturing concerned, the offset amount Od to be calculated from the pre-held relationship between the number N of the scanning line 5, which is to be applied with the ON voltage in the readout processing, and the offset amount O(N), which results from the dark electric charges superimposed on the image data D to be read out, and the like, in the case where the readout starting line Ls is set as the starting point, becomes such an amount having the brightness difference at the portion of the readout starting line Ls.

Then, the above-described relationship is modified to the shape in which the starting point concerned is moved to the position of the readout starting line Ls, and the offset amount Od for each of the scanning lines 5 is calculated, and accordingly, in the offset amount Od for each of the scanning lines 5, which is to be calculated by modifying the above-described relationship, the position of the brightness difference comes to be located at the position of the readout starting line Ls without fail.

Therefore, it becomes possible to certainly set, at the same position, the position of the brightness difference in the image data D read out from each of the radiation detection elements 7 of the radiation image capturing apparatus 1, and the position of the brightness difference in the offset amount Od for each of the scanning lines 5, which is to be applied thereto.

Therefore, subtraction processing is performed for the offset amount Od for each of the scanning lines 5, which is calculated as described above, from the preview image data Dp extracted from the image data D, whereby the mutual brightness differences thereof are cancelled with each other. Therefore, in this embodiment, it becomes possible to carry out the image correction so as to accurately remove the brightness difference from the preview image p_pre.

As described above, in accordance with the radiation image capturing system 50 and the console 58 according to this embodiment, the offset amount Od (refer to FIG. 22B) for each of the scanning lines 5 in the radiation image capturing concerned, the offset amount Od to be calculated from the relationship between the number N of the scanning line 5, which is to be applied with the ON voltage in the readout processing, and the offset amount O(N), which results from the dark electric charges superimposed on the image data D to be read out, and the like, in the case where the readout starting line Ls is set as the starting point, the relationship being held in advance by the console 58, becomes such an amount having the brightness difference at the portion of the readout starting line Ls.

Therefore, as described above, the subtraction processing is performed for the offset amount Od for each of the scanning lines 5, which is calculated as described above, from the preview image data Dp extracted from the image data D, whereby the mutual brightness differences thereof are cancelled with each other. Therefore, in this embodiment, it becomes possible to carry out the image correction so as to accurately remove the brightness difference from the preview image p_pre.

In addition, the above-described offset amount Od for each of the scanning lines 5 can be calculated only by moving the starting point of the above-described pre-held relationship to the position of the readout starting line Ls. Therefore, it becomes possible to calculate the offset amount Od for each of the scanning lines 5 extremely easily, and it becomes possible to carry out the above-described image correction extremely simply.

Therefore, it becomes possible to display the preview image p_pre in an appropriate state where the brightness difference is removed therefrom, and in addition, it becomes possible to carry out the image correction simply therefor and to display the preview image p_pre rapidly. Therefore, it becomes possible for the operator such as the radiographer to confirm the preview image p_pre earlier and to rapidly determine whether or not the re-capturing is necessary, and so on.

Note that, in such generation processing for the radiation image p, which uses the image data D and the offset data O, if a configuration is adopted so that readout processing for the offset data O can be performed by repeating the same processing sequence as the processing sequence up to the readout processing for the image data D as the main image as in this embodiment mentioned above, then the positions of the readout starting lines Ls in the readout processing for the image data D and the readout processing for the offset data O become the same.

Therefore, in the image data D and the offset data O, the brightness differences occur at the same position of the readout starting lines Ls. Therefore, the subtraction processing is performed (refer to the above-described Expression (1)) for the offset data O from the image data D in accordance with the usual processing, whereby the brightness differences can be removed from the true image data D* to be calculated, and from the radiation image p to be generated based on the same.

Meanwhile, in the above-described embodiment, the description has been made of the case where the above-described relationship (refer to FIG. 22A) is calculated by using the average values Dave(n) of the image data D for each of the scanning lines 5 as shown in FIGS. 21A to 21C, and this one relationship is applied to the preview image data Dp.

However, it is also possible to adopt such a configuration as follows. That is to say, the image data D itself is used without using the average values Dave (n) of the image data D for each of the scanning lines 5, and for example, the method shown in FIGS. 21A to 21C is applied to the respective image data D read out from the respective radiation detection elements 7 connected to a certain signal line 6, the above-described constants a to c are calculated for each of the signal lines 6, and the above-described calculation processing for the offset amount Od, and the like are performed for each of the signal lines 6.

Moreover, in an experiment by an actual machine, the following is confirmed. That is to say, by adopting a configuration as in the above-described embodiment, the brightness difference is substantially removed from the preview image p_pre, and can be reduced at least to an extent where the operator such as the radiographer cannot visually recognize the same, or to an extent where the operator is not concerned by the brightness difference such that the operation is not hindered even if the brightness difference remains if seen carefully.

However, as well known, the offset amount Od, which results from the dark electric charges superimposed on the image data D, and the like, is changed owing to a temperature of the respective radiation detection elements 7, and the like. Therefore, it is also possible to adopt such a configuration as follows. That is to say, for example, the relationship expressed by the above-described Expression (2) is obtained in a form further depending on the temperature, a temperature sensor is provided on the sensor panel SP (refer to FIG. 1) and the like of the radiation image capturing apparatus 1, and the temperature of the respective radiation detection elements 7 is estimated from the image data D to be read out, and so on, whereby the above-described relationship is applied while being modified to a form corresponding to the obtained temperature.

Moreover, it is needless to say that the present invention is not limited to the above-described embodiment and the like, and is appropriately modifiable within the scope without departing from the spirit of the present invention.

The entire disclosure of Japanese Patent Application No. 2012-075831 filed on Mar. 29, 2012 including specification, claims, drawings and abstract are incorporated herein by reference in its entirety.

What is claimed is:

1. A radiation image capturing system comprising:
   a radiation image capturing apparatus including:
   a plurality of scanning lines and a plurality of signal lines, both of the lines arranged to intersect each other;
   a plurality of radiation detection elements arrayed two-dimensionally;
   a scan drive unit which switches a voltage to be applied to the scanning lines between an ON voltage and an OFF voltage;
   switch units connected to the scanning lines, the switch units to discharge electric charge accumulated in the radiation detection elements to the signal lines when the ON voltage is applied;
   a readout circuit which reads out the electric charge discharged to the signal lines; and
   a control unit which detects a start of radiation irradiation based on data to be changed by the radiation irradiation, sets a scanning line from which readout of image data is started from timing at a time of the detection, starts application of the ON voltage from the set scanning line to read out the image data, and generates preview image data from the readout image data; and
   a console which displays a preview image based on the preview image data transmitted from the radiation image capturing apparatus and information regarding the scanning line from which the readout of the image data is started,
   wherein the console holds in advance a relationship between a number of the scanning line in a case where the radiation image capturing apparatus sets, as a starting point, the scanning line from which readout of the image data is started and an offset amount superimposed on the image data to be read out, and
   when the preview image is displayed, based on the information regarding the scanning line from which the readout of the image data is started, modifies the relationship to a form in which the starting point is moved to a position of the scanning line from which the radiation image capturing apparatus actually starts the readout of the image data, calculates the offset amount for each of the scanning lines, and generates and displays the preview image based on a value obtained by subtracting the offset amount from the corresponding preview image data.

2. The radiation image capturing system of claim 1, wherein, in a case where a number of the scanning line is N when the number of the scanning line which is the starting point is 0, the offset amount in the scanning line in which the number is N is O(N), and a, b and c are each constants, the relationship is set in a following form:

$$O(N)=a\times(1-b^{-N})+c.$$

3. The radiation image capturing system of claim 1, wherein the control unit of the radiation image capturing apparatus repeatedly performs leaked data readout processing for converting the electric charge into leaked data by the readout circuits, the electric charge being leaked from the radiation detection elements through the switch units in a state where the OFF voltage is applied from the scan drive unit to the scanning lines and the switch units are turned to an OFF state, defines the readout leaked data as data to be changed by the radiation irradiation, and detects the start of the radiation irradiation at a point of time when the readout leaked data exceeds a threshold value.

4. The radiation image capturing system of claim 1, wherein the control unit of the radiation image capturing apparatus sequentially applies the ON voltage from the scan drive unit to the scanning lines, repeatedly performs readout processing for image data for detection of the start of the irradiation from the radiation detection elements, defines the readout image data for the detection of the start of the irradiation as data to be changed by the radiation irradiation, and detects the start of the radiation irradiation at a point of time when the readout image data for the detection of the start of the irradiation exceeds a threshold value.

5. The radiation image capturing system of claim 1, wherein bias lines for applying a reverse bias voltage to the radiation detection elements of the radiation image capturing apparatus are connected to the respective radiation detection elements, current detection units which detect a current flowing through the bias lines are connected to the bias lines, and the control unit of the radiation image capturing apparatus defines a value of a current as data to be changed by the radiation irradiation, the current to be output from the current detection unit which detects the current flowing through the bias lines from the radiation detection elements, and detects the start of the radiation irradiation at a point of time when the value of the current output from the current detection unit exceeds a threshold value.

6. A console that, upon receiving from a radiation image capturing apparatus preview image data and information regarding a scanning line from which readout of image data is started, displays a preview image based on the preview image data transmitted thereto,
wherein the console holds in advance a relationship between a number of the scanning line in a case where the radiation image capturing apparatus sets, as a starting point, the scanning line from which the readout of the image data is started and an offset amount superimposed on the readout image data, and
when the preview image is displayed, based on the information regarding the scanning line from which the readout of the image data is started, modifies the relationship to a form in which the starting point is moved to a position of the scanning line from which the radiation image capturing apparatus actually starts the readout of the image data, calculates the offset amount for each of the scanning lines, and generates and displays the preview image based on a value obtained by subtracting the offset amount from the corresponding preview image data.

* * * * *